(12) United States Patent
Li et al.

(10) Patent No.: US 8,204,327 B2
(45) Date of Patent: Jun. 19, 2012

(54) CONTEXT ADAPTIVE HYBRID VARIABLE LENGTH CODING

(75) Inventors: Junlin Li, San Jose, CA (US); Ghassan AlRegib, Savannah, GA (US); Dihong Tian, San Jose, CA (US); Wen-hsiung Chen, Sunnyvale, CA (US); Pi Sheng Chang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 12/336,364

(22) Filed: Dec. 16, 2008

(65) Prior Publication Data
US 2009/0154820 A1   Jun. 18, 2009

Related U.S. Application Data

(63) Continuation-in-part of application No. 12/016,441, filed on Jan. 18, 2008, and a continuation-in-part of application No. 12/030,821, filed on Feb. 13, 2008, now Pat. No. 8,041,131.

(60) Provisional application No. 60/976,742, filed on Oct. 1, 2007, provisional application No. 60/976,853, filed on Oct. 2, 2007.

(51) Int. Cl.
*G06K 9/36* (2006.01)
*G06K 9/46* (2006.01)

(52) U.S. Cl. ........................................ 382/246

(58) Field of Classification Search .................. 382/167, 382/232, 233, 238, 244–246, 250, 251; 375/240.03, 375/240.12, 240.16, 240.18, 240.2, E7.027, 375/E7.144, E07.001, E07.235; 348/390.1, 348/441; 341/50, 51, 67, 106, 107; 358/426.02, 358/426.12

See application file for complete search history.

(56) References Cited

U.S. PATENT DOCUMENTS
5,339,164 A * 8/1994 Lim .......................... 358/426.02
(Continued)

FOREIGN PATENT DOCUMENTS
WO   WO2006/001994   1/2006
(Continued)

OTHER PUBLICATIONS

D. Marpe, H. Schwarz, and T. Wiegand, "Context-Based Adaptive Binary Arithmetic Coding in the H.264/AVC Video Compression Standard," IEEE Trans. Circuits Systems Video Technology, vol. 13, No. 7, Jul. 2003, pp. 620-636.

(Continued)

*Primary Examiner* — Amir Alavi
(74) *Attorney, Agent, or Firm* — Dov Rosenfeld; Inventek

(57) ABSTRACT

A coding method for an ordered series of quantized transform coefficients of a block of image data, including a context adaptive position coding process to encode the position of clusters of non-zero-valued coefficients, e.g., a multidimensional position coder that uses one of a plurality of code mappings selected according to at least one criterion including at least one context-based criterion, and an amplitude encoding process to encode any amplitudes remaining to be coded, the amplitude coding using one or a plurality of amplitude code mappings selected according to at least one criterion, including a context-based criterion. A context-based selection criterion is meant a criterion that during encoding is known or derivable from one or more previously encoded items of information. Also a coding apparatus, a decoding apparatus, a computer readable medium configured with instructions that when executed implement a coding method, and another medium for a decoding method.

25 Claims, 18 Drawing Sheets

U.S. PATENT DOCUMENTS

| | | | |
|---|---|---|---|
| 7,471,841 B2 | 12/2008 | Wu et al. | |
| 7,499,596 B2 | 3/2009 | Chen et al. | |
| 8,036,471 B2* | 10/2011 | Li et al. | 382/232 |
| 8,041,131 B2* | 10/2011 | Li et al. | 382/232 |
| 2004/0021592 A1* | 2/2004 | Karczewicz | 341/67 |
| 2005/0276487 A1 | 12/2005 | Chen et al. | 382/232 |
| 2005/0281331 A1* | 12/2005 | Hahm et al. | 375/240.03 |
| 2006/0039615 A1 | 2/2006 | Chen et al. | 382/232 |
| 2006/0056720 A1 | 3/2006 | Chen et al. | 382/245 |
| 2007/0019877 A1 | 1/2007 | Chen et al. | 382/245 |
| 2007/0036448 A1 | 2/2007 | Kang | 382/246 |
| 2007/0121728 A1 | 5/2007 | Wang et al. | 375/240.18 |
| 2007/0217506 A1 | 9/2007 | Yang et al. | 375/240.03 |
| 2007/0258518 A1* | 11/2007 | Tu et al. | 375/240.03 |
| 2009/0086815 A1* | 4/2009 | Tian et al. | 375/240.03 |
| 2009/0154820 A1* | 6/2009 | Li et al. | 382/246 |
| 2011/0080946 A1* | 4/2011 | Li et al. | 375/240.03 |

FOREIGN PATENT DOCUMENTS

| | | |
|---|---|---|
| WO | WO2006001994 A2 | 1/2006 |
| WO | WO 2007/056657 | 5/2007 |

OTHER PUBLICATIONS

Q. Wang, D. Zhao, S. Ma, Y. Lu, Q. Huang, and W. Gao, "Context-Based 2D-VLC for Video Coding," Proceedings of 2004 IEEE International Conference on Multimedia, ICME 04, vol. 1, Jun. 2004, pp. 89-92.

PCT Search Report for PCT Application No. PCT/US2008/078359 mailed on Mar. 19, 2009.

\* cited by examiner

Table 1

| x | Event (Rz, 2, x) coefficient patterns |
|---|---|
| 0 | 11 |
| 1 | *1 |
| 2 | 1* |
| 3 | ** |

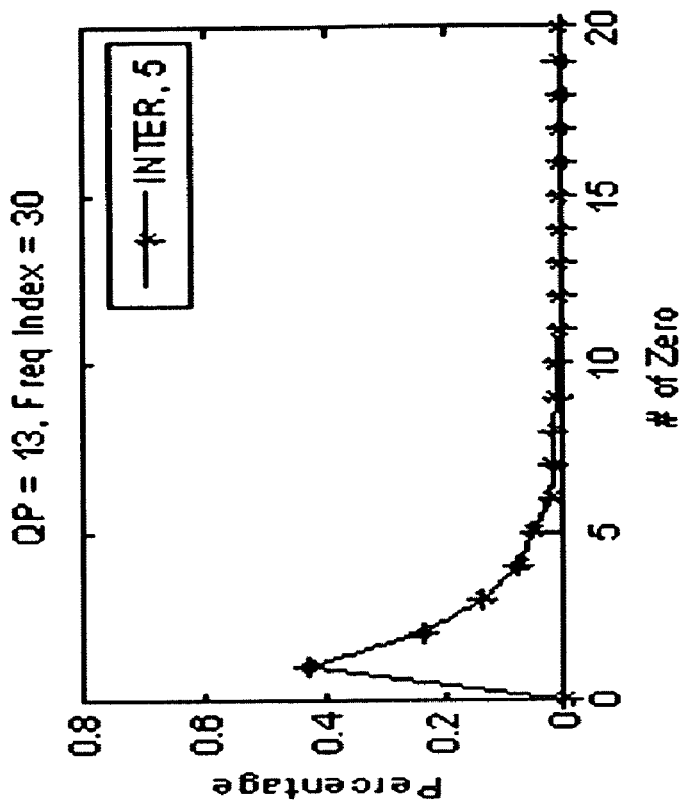
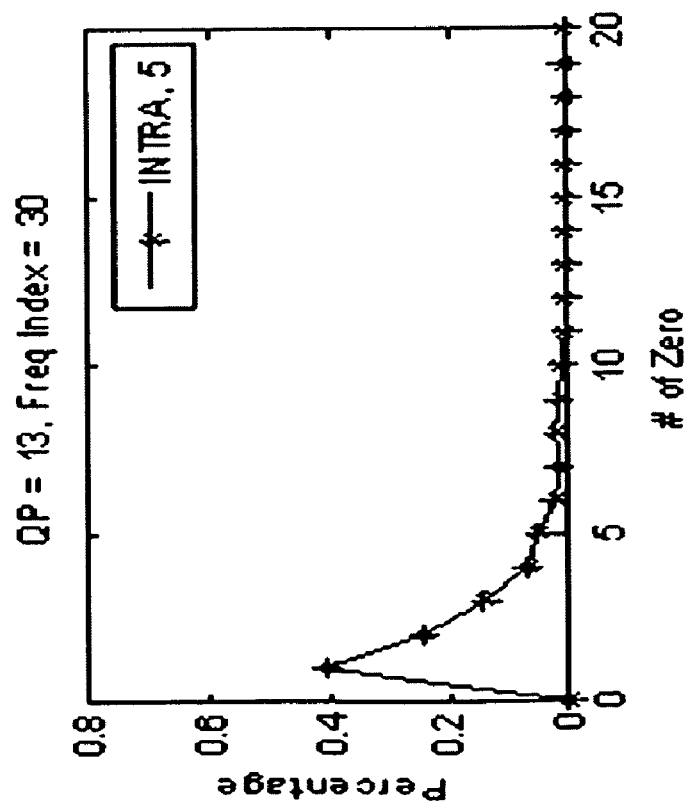
FIG. 5C
FIG. 5D

| Table 2 | | | | | | | |
|---|---|---|---|---|---|---|---|
| | | Non-zero run-length of the recent cluster Rnz_pre | | | | | |
| | | n5 to 64 | n4 to n5 | n3 to n4 | n2 to n3 | n1 to n2 | 1 to n1 |
| Max zero run-length of previous | 0 to z1 | VLC00 | VLC01 | VLC02 | VLC03 | VLC04 | VLC05 |
| | z1 to z2 | VLC10 | VLC11 | VLC12 | VLC13 | VLC14 | VLC15 |
| | z2 to z3 | VLC20 | VLC21 | VLC22 | VLC23 | VLC24 | VLC25 |
| | z3 to z4 | VLC30 | VLC31 | VLC32 | VLC33 | VLC34 | VLC35 |
| | z4 to z5 | VLC40 | VLC41 | VLC42 | VLC43 | VLC44 | VLC45 |
| | z5 to 63 | VLC50 | VLC51 | VLC52 | VLC53 | VLC54 | VLC55 |

FIG. 8

| Table 3: An example of context-based VLC table selection for position coding ||||||||
|---|---|---|---|---|---|---|---|
| | | Present frequency index |||||||
| | | 0 | 1 to $I_1$ | $I_1$ to $I_2$ | $I_2$ to $I_3$ | $I_3$ to $I_4$ | $I_4$ to 63 | |
| Previous maximum Run_z | 0 | $VLC_p0$ | $VLC_p0$ | $VLC_p1$ | $VLC_p1$ | $VLC_p2$ | $VLC_p2$ |
| | $R_1$ | - | $VLC_p1$ | $VLC_p1$ | $VLC_p2$ | $VLC_p2$ | $VLC_p3$ |
| | $R_2$ | - | $VLC_p1$ | $VLC_p2$ | $VLC_p3$ | $VLC_p3$ | $VLC_p4$ |
| | $R_3$ | - | - | $VLC_p2$ | $VLC_p3$ | $VLC_p4$ | $VLC_p4$ |
| | . . . | . . . | . . . | . . . | . . . | . . . | . . . |

FIG. 10

CONTEXT ADAPTIVE HYBRID VARIABLE LENGTH CODING

RELATED APPLICATIONS

The present invention is a continuation in part of commonly assigned U.S. patent application Ser. No. 12/016,441 filed Jan. 18, 2008 to Tian et al., and titled CONTEXT ADAPTIVE POSITION AND AMPLITUDE CODING OF COEFFICIENTS FOR VIDEO COMPRESSION (hereinafter U.S. Ser. No. 12/016,441). The present invention is also a continuation in part of commonly assigned U.S. patent application Ser. No. 12/030,821 filed Feb. 13, 2008 now U.S. Pat. No. 8,041,131 to inventors Li et al, and titled VARIABLE LENGTH CODING OF COEFFICIENT CLUSTERS FOR IMAGE AND VIDEO COMPRESSION (hereinafter U.S. Ser. No. 12/030,821). U.S. Ser. No. 12/016,441 claims priority of U.S. Provisional Application 60/976,742 filed Oct. 1, 2007. Ser. No. 12/030,821 claims priority of US. 60/976,853, filed Oct. 2, 2007. The contents of each of U.S. Ser. No. 12/016,441, U.S. Ser. No. 12/030,821, U.S. 60/976,853, and U.S. 60/976,742 are incorporated herein by reference.

FIELD OF THE INVENTION

The present disclosure relates generally to image and video compression, and in particular to variable length coding of quantized transform coefficients as occurs in transform-based image and video compression methods.

BACKGROUND

Transform coding and decoding of video data usually includes what is called entropy coding. For compression, the pixel information of a picture, e.g., of a residual picture after motion compensated prediction, or of a picture for intra-coding is divided into blocks. The blocks are transformed, e.g., by a discrete cosine transform (DCT) or a similar transform, and the resulting transform coefficients are quantized. The quantized transform coefficients are ordered, e.g., from low to higher frequencies along a path in the two dimensional transform domain. The ordered series of quantized transform coefficients is then losslessly encoded by an entropy coding method. One popular entropy coding method is variable length coding in which one or more events, representing one or more quantized coefficients of properties thereof are encoded by codewords such that events that are more likely-to-occur are encoded on average by codewords that are shorter than are events that are less likely-to-occur. Variable length coding (VLC), due to its nice tradeoff in efficiency and simplicity, has been widely used in entropy coding, particularly when the codec is desired to have low computational complexity.

The coding methods disclosed in U.S. Ser. No. 12/016,441 include a two-way position and amplitude coding process for a series of quantized coefficients. Positions of non-zero quantized transform coefficients are ordered, e.g., in a forward zigzag scan order and by multiple VLC tables with adaptive table switch based on the context. By context is meant one or more items of information determinable from previously encoded information and useful in predicting behavior, e.g., information determined from previously coded coefficients. Amplitudes of the quantized coefficients, on the other hand, are coded in an order reverse to the forward zigzag scan order and are regrouped into sub-sequences according to their adjacency to zeros. These subsequences are coded with different respective (multidimensional) VLC mappings that have different dimensionality.

The coding methods disclosed in U.S. Ser. No. 12/030,821 include encoding the run-length of each cluster of non-zero valued quantized coefficients and the run-length of each cluster's preceding zero coefficients together as a pair, in combination with a parameter that indicates the number of trailing coefficients in that non-zero cluster that have a amplitude of 1. Remaining amplitudes are coded separately by a one-dimensional VLC mapping, e.g., a code table.

Each of the methods described in U.S. Ser. No. 12/030,821 and U.S. Ser. No. 12/016,441 offers advantage.

BRIEF DESCRIPTION OF THE DRAWINGS

FIGS. 5A to 5F shows sample plots of correlation between the run-length of preceding consecutive zeros of the presently being coded quantized coefficient cluster and the maximum run-length of preceding zeros of all previously encoded clusters in the same block in order to demonstrate the rationale of using a particular type of context in embodiments of the present invention.

FIG. 8 shows one example of threshold based selection of 3-D VLC tables for coding in some embodiments of the invention.

FIG. 10 shows Table 3 that illustrates by way of example, how in some embodiments, a VLC table is selected based upon the previous maximum run of zero-valued quantized coefficients preceding a non-zero-value and the present frequency index components.

DESCRIPTION OF EXAMPLE EMBODIMENTS

Overview

Figures 1, 2:
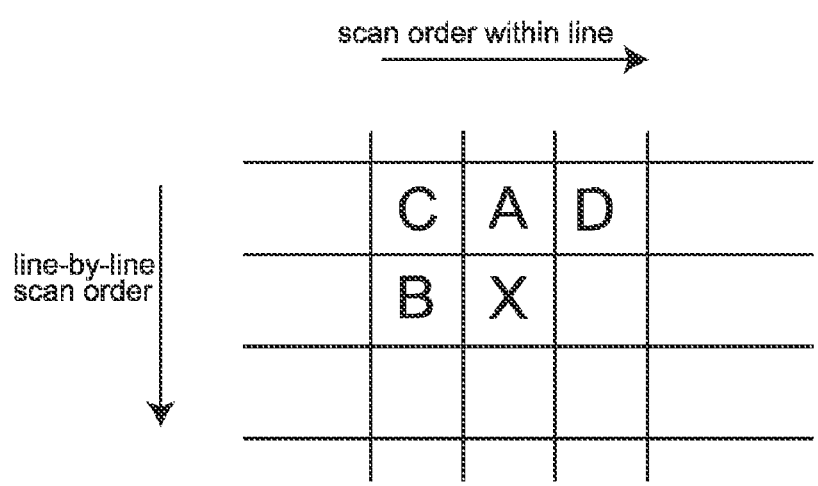
FIG. 1 shows a table for the value of a parameter x for different patterns for a particular length 2 event as used in embodiments of the present invention.
FIG. 2 shows a scan order of coding a two-dimensional array of image blocks in a left-to-right order within a row, and a top-to-bottom row-by-row order, and also shows a currently being coded block X and two previously coded neighbor blocks A and B.

Embodiments of the present invention include a method, and apparatus, and logic encoded in one or more computer-readable tangible medium to carry out a method. The method is to code an ordered series of quantized coefficients obtained by transforming a block of image data.

Some embodiments of the present invention incorporate the VLC schemes described in U.S. Ser. No. 12/030,821 with the context adaptive essence of U.S. Ser. No. 12/016,441. Some embodiments of the present invention differ from U.S. Ser. No. 12/016,441 by including, for each cluster of non-zero-amplitude quantized coefficients in a first region of the ordered series, jointly coding coefficient positions with trailing amplitudes of amplitude 1 with coding of remaining amplitudes of each cluster by 1-D VLC. Embodiments of U.S. Ser. No. 12/016,441 described context within a block quantized transform coefficients. Some embodiments of the present invention also take into account previously coded neighboring coefficient blocks for coding the current block. Furthermore, some embodiments of the present invention improve upon the non-context adaptive methods described in U.S. Ser. No. 12/030,821 by using multiple VLC tables in each of the position and amplitude coding methods and performing context-based table switch. By properly integrating all the components into a context adaptive hybrid variable length coding scheme, one proposed method is expected to further improve the compression efficiency of high-resolution image and video content.

Some embodiment of context adaptive hybrid variable length coding described herein include, for a first region, which might be the whole ordered series of quantized transform coefficients, a three-dimensional joint position and amplitude coding process and a one-dimensional (1-D) amplitude process, both of which are carried out in a context adaptive fashion.

Particular embodiments include a method of coding using a coding apparatus. The method is for an ordered series of quantized transform coefficients of a block of image data. The ordering is from low to high spatial frequency according to the transform. The series has a most likely-to-occur amplitude, and at least one other amplitude, including a next-to-most likely-to-occur amplitude. For a first region which could be the whole series, the method includes encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion. The method further includes, if the position coding of the events leaves any amplitude values other than the most likely-to-occur amplitude to be encoded, encoding the amplitudes of the to-be-encoded amplitude values in the reverse order of the original ordering of the series or cluster if events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion. By a context-based selection criterion is meant a criterion that during encoding is known or derivable from one or more previously encoded items of information.

In some such method embodiments, the position coding of events includes jointly encoding the next joint position and amplitude event that is defined by the next cluster of one or more consecutive coefficients each having any other than the most likely-to-occur amplitude. Each event is defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude. The coding for the first cluster that is being position coded is according to a three-dimensional joint VLC mapping selected according to one or more initial position VLC selection criteria, including at least one context-based initial position VLC selection criterion. After the first cluster is position coded, the position encoding is according to one or more position VLC selection criteria, including at least one context-based position VLC selection criterion. In one such embodiment, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude.

In some such method embodiments, the amplitude VLC mappings are one-dimensional mappings, and the encoding of the amplitudes of the to-be-encoded amplitude values includes, for each cluster wherein there is at least one amplitude still to be encoded, encoding, in reverse ordering to the ordering of the series, the next to-be-encoded amplitude according to one of the plurality of pre-selected amplitude VLC mappings. The amplitude VLC mapping is initially selected according to one or more initial amplitude VLC selection criteria, including at least one context-based initial amplitude VLC selection criterion, and thereafter selected after determining whether to switch to another of the plurality of amplitude VLC mappings according to one or more amplitude VLC selection criteria, including at least one context-based amplitude VLC selection criterion. In some embodiments, at least one context based amplitude VLC selection criterion includes the maximum amplitude of the previously coded coefficients in the cluster of coefficients having other than the most likely-to-occur value.

In some such method embodiments, in the case the series is formed from a particular block of image data, the at least one context-based initial position VLC selection criterion includes the average number of non-zero coefficients in one or more previously blocks that are neighbors to the particular block and that underwent the encoding of position.

In some such method embodiments, the at least one context-based position VLC selection criterion includes one or both of a) the number of coefficients having other than the most likely-to-occur amplitude in the most recently encoded cluster in the first region, and/or b) for some or all clusters in the first region that underwent the encoding of position, the maximum number of consecutive quantized coefficients having the most-likely-to-occur value preceding each such previously encoded cluster or clusters.

In some such method embodiments, the first region is one of a plurality of regions, and the method further includes encoding the coefficients in the remaining region(s).

Particular embodiments include a computer-readable medium encoded with computer-executable instructions that when executed by at least one processor of a processing system causes carrying out of a method of coding an ordered series of quantized transform coefficients of a block of image data. The ordering is from low to high spatial frequency according to the transform. The series has a most likely-to-occur amplitude, and at least one other amplitude, including a next-to-most likely-to-occur amplitude. For a first region which could be the whole series, the method includes encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion. The method further includes, if the position coding of the events leaves any amplitude values other than the most likely-to-occur amplitude to be encoded, encoding the amplitudes of the to-be-encoded amplitude values in the reverse order of the original ordering of the series or cluster if events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion. By a context-based selection criterion is meant a criterion that during encoding is known or derivable from one or more previously encoded items of information.

In some such computer readable medium embodiments, the position coding of events includes jointly encoding the next joint position and amplitude event that is defined by the next cluster of one or more consecutive coefficients each having any other than the most likely-to-occur amplitude. Each event is defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude. The coding for the first cluster that is being position coded is according to a three-dimensional joint VLC mapping selected according to one or more initial position VLC selection criteria, including at least one context-based initial position VLC selection criterion. After the first cluster is position coded, the position encoding is according to one or more position VLC selection criteria, including at least one context-based position VLC selection criterion. In one such embodiment, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude.

In some such computer readable medium embodiments, the amplitude VLC mappings are one-dimensional mappings, and the encoding of the amplitudes of the to-be-encoded amplitude values includes, for each cluster wherein there is at least one amplitude still to be encoded, encoding, in reverse ordering to the ordering of the series, the next to-be-encoded amplitude according to one of the plurality of pre-selected amplitude VLC mappings. The amplitude VLC mapping is initially selected according to one or more initial amplitude VLC selection criteria, including at least one context-based initial amplitude VLC selection criterion, and thereafter selected after determining whether to switch to another of the plurality of amplitude VLC mappings according to one or more amplitude VLC selection criteria, including at least one context-based amplitude VLC selection criterion. In some embodiments, at least one context based amplitude VLC selection criterion includes the maximum amplitude of the previously coded coefficients in the cluster of coefficients having other than the most likely-to-occur value.

In some such computer readable medium embodiments, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude Particular embodiments include an apparatus configured to encode an ordered series of quantized transform coefficients of a block of image data, the ordering from low to high spatial frequency according to the transform, the series having a most likely-to-occur amplitude, and at least one other amplitude including a next-to-most likely-to-occur amplitude. The apparatus includes a first region position encoder configured to encode the position of events in a first region of the series, the first region possibly the whole region, each event including one quantized coefficient having other than the most likely-to-occur amplitude or a cluster of at least one quantized coefficient having other than the most likely-to-occur amplitude, the encoding of the position by the first region position encoder using a plurality of predetermined variable length code (VLC) mappings, the first region position encoder configured to initially select an initial position VLC mapping, and to later switching between position VLC mappings according to one or more position VLC selection criteria, including at least one context-based position VLC selection criterion. The apparatus further includes a second region amplitude encoder configured to encode, in the case the first region position encoder leaves any amplitude values other than the most likely-to-occur amplitude to be encoded, the amplitudes of the to-be-encoded amplitude values in the reverse order of the original ordering of the series or cluster if events includes a cluster, the encoding by the first region amplitude encoder being according to one of a plurality of pre-selected amplitude VLC mappings, the first region amplitude encoder configured to initially selecting an amplitude VLC mapping, and to later switch between the plurality of amplitude VLC mappings according to one or more amplitude VLC selection criteria, including at least one context-based amplitude VLC selection criterion. By a context-based selection criterion is meant a criterion that during encoding is known or derivable from one or more previously encoded items of information. The position coding of events includes jointly encoding the next joint position and amplitude event that is defined by the next cluster of one or more consecutive coefficients each having any other than the most likely-to-occur amplitude, each event defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude, the coding for the first cluster being position coded being according to a three-dimensional joint VLC mapping selected according to one or more initial position VLC selection criteria, including at least one context-based initial position VLC selection criterion, and after the first cluster is position coded, according to one or more position VLC selection criteria, including at least one context-based position VLC selection criterion. In one such embodiment, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude.

Particular embodiments include a method of decoding using a decoding apparatus. The method includes recognizing codewords in a set of concatenated codewords, the codewords formed by a context adaptive coding method that includes forming codewords based one or more context based criteria that during encoding are known or derivable from one or more previously encoded items of information, and decoding the codewords using one or more of a plurality of position VLC mappings and one or more of a plurality of amplitude VLC mappings. The context adaptive coding method is to code an ordered series of quantized transform coefficients of a block of image data. The ordering is from low to high spatial frequency according to the transform. The series has a most likely-to-occur amplitude, and at least one other amplitude including a next-to-most likely-to-occur amplitude. For a first region which could be the whole series, the coding method includes encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion. The coding method further includes, if the position coding of the events leaves any amplitude values other than the most likely-to-occur amplitude to be encoded, encoding the amplitudes of the to-be-encoded amplitude values in the reverse order of the original ordering of the series or cluster if events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion. By a context-based selection criterion is meant a criterion that during encoding is known or derivable from one or more previously encoded items of information. In some such coding method embodiments, the position coding of events includes jointly encoding the next joint position and amplitude event that is defined by the next cluster of one or more consecutive coefficients each having any other than the most likely-to-occur amplitude. Each event is defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude. The coding for the first cluster that is being position coded is according to a three-dimensional joint VLC mapping selected according to one or more initial position VLC selection criteria, including at least one context-based initial position VLC selection criterion. After the first cluster is position coded, the position encoding is according to one or more position VLC selection criteria, including at least one context-based position VLC selection criterion. In one such embodiment, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude. Furthermore, in some such coding method embodiments, the amplitude VLC mappings are one-dimensional mappings, and the encoding of the amplitudes of the to-be-encoded amplitude values includes, for each cluster wherein there is at least one amplitude still to be encoded, encoding, in reverse ordering to the ordering of the series, the next to-be-encoded amplitude according to one of the plurality of pre-selected amplitude VLC mappings. The amplitude VLC mapping is initially selected according to one or more initial amplitude VLC selection criteria, including at least one context-based initial amplitude VLC selection criterion, and thereafter selected after determining whether to switch to another of the plurality of amplitude VLC mappings according to one or more amplitude VLC selection criteria, including at least one context-based amplitude VLC selection criterion. In some embodiments, at least one context based amplitude VLC selection criterion includes the maximum amplitude of the previously coded coefficients in the cluster of coefficients having other than the most likely-to-occur value. In some coding method embodiments, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude. During decoding of a codeword, any context-based selection criterion is known or derivable from one or more previously decoded items of information.

Particular embodiments include a computer-readable medium encoded with computer-executable instructions that when executed by at least one processor of a processing system causes carrying out of any method of decoding described in the above paragraph.

Particular embodiments include an apparatus configured to decode a set of concatenated codewords formed by a context adaptive coding method. The apparatus includes a codeword recognizer configured to recognize codewords in the set of concatenated codewords. The codewords are formed by the context adaptive coding method, including forming codewords based one or more context based criteria that during encoding are known or derivable from one or more previously encoded items of information. The apparatus further includes a codeword decoder configured to decode the recognized codeword. The context adaptive coding method is to code an ordered series of quantized transform coefficients of a block of image data. The ordering is from low to high spatial frequency according to the transform. The series has a most likely-to-occur amplitude, and at least one other amplitude including a next-to-most likely-to-occur amplitude. For a first region which could be the whole series, the coding method includes encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion. The coding method further includes, if the position coding of the events leaves any amplitude values other than the most likely-to-occur amplitude to be encoded, encoding the amplitudes of the to-be-encoded amplitude values in the reverse order of the original ordering of the series or cluster if events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion. By a context-based selection criterion is meant a criterion that during encoding is known or derivable from one or more previously encoded items of information. In some such coding method embodiments, the position coding of events includes jointly encoding the next joint position and amplitude event that is defined by the next cluster of one or more consecutive coefficients each having any other than the most likely-to-occur amplitude. Each event is defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude. The coding for the first cluster that is being position coded is according to a three-dimensional joint VLC mapping selected according to one or more initial position VLC selection criteria, including at least one context-based initial position VLC selection criterion. After the first cluster is position coded, the position encoding is according to one or more position VLC selection criteria, including at least one context-based position VLC selection criterion. In one such embodiment, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude. Furthermore, in some such coding method embodiments, the amplitude VLC mappings are one-dimensional mappings, and the encoding of the amplitudes of the to-be-encoded amplitude values includes, for each cluster wherein there is at least one amplitude still to be encoded, encoding, in reverse ordering to the ordering of the series, the next to-be-encoded amplitude according to one of the plurality of pre-selected amplitude VLC mappings. The amplitude VLC mapping is initially selected according to one or more initial amplitude VLC selection criteria, including at least one context-based initial amplitude VLC selection criterion, and thereafter selected after determining whether to switch to another of the plurality of amplitude VLC mappings according to one or more amplitude VLC selection criteria, including at least one context-based amplitude VLC selection criterion. In some embodiments, at least one context based amplitude VLC selection criterion includes the maximum amplitude of the previously coded coefficients in the cluster of coefficients having other than the most likely-to-occur value. In some coding method embodiments, for some or all cluster lengths, the third parameter is the number of consecutive trailing coefficients in the cluster that each has the next-to-most likely-to-occur amplitude. In another such embodiment, in the case such third parameter is not for all cluster lengths, for at least one cluster length, e.g., for the case there are two coefficients having amplitude other than the most likely-to-occur amplitude in the cluster, the third parameter includes an indication of which of the coefficients in the cluster have the next-to-most likely-to-occur amplitude. In yet another embodiment, in the case there is only one coefficient in the cluster having amplitude other than the most-likely-to-occur amplitude, the third parameter is the amplitude that coefficient having other than the most-likely-to-occur amplitude. During decoding of a codeword by the codeword decoder, any context-based selection criterion is known or derivable from one or more previously decoded items of information.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Position and Amplitude Coding Methods

In transform coding, an image is partitioned into blocks, and each block of image data is transformed by a transform such as the discrete cosine transform (DCT) as in MPEG-1, MPEG-2, and so forth, an integer transform such as used in ITU-T recommendation H.264, known as H.264/AVC and as MPEG-4, part 10, or some other transform wherein the transform domain has an ordering that somehow is indicative of spatial frequency.

For the description herein, suppose the quantization is such that 0 is the most likely-to-occur amplitude, and 1 is the next most-likely-to-occur amplitude. The invention, however, is not limited to that case; of course the quantization mapping of assigning different ones of a finite number of "amplitudes" to ranges of coefficient amplitudes can be such that a value other than 0 is assigned to the most likely-to-occur amplitude range, and a value other than 1 is assumed to the next most likely-to-occur amplitude range.

The transform coefficients are ordered in a forward spatial frequency direction, e.g., along a zigzag order of increasing frequency in a two-dimensional spatial frequency) plane. Consider the ordered series of quantized transform coefficients in the forward, i.e., increasing spatial frequency order. Such a forward scanned series includes clusters of consecutive non-zero valued coefficients. Unless a non-zero amplitude as the last quantized coefficient in the series, which is typically unlikely, each cluster is followed by at least one zero-valued quantized coefficient. In embodiments of the present invention, a cluster as coded is defined as including one immediately following zero-valued quantized coefficient. The clusters may be preceded by consecutive zero-valued quantized coefficients. Thus, each cluster and any preceding 0s can be defined by two quantities, the size of the cluster, and the length of any preceding run of zero-valued quantized coefficients. Denote by Rnz, Rnz≧1, the number of non-zero-amplitude quantized coefficients in a cluster that includes one following zero-valued coefficient, and denote by Rz, Rz≧0 the number of consecutive zero-values preceding the cluster. Thus the run-length pair (Rz, Rnz), Rz≧0, Rnz≧1 defines Rz zero-valued quantized coefficients, followed by Rnz non-zero-valued quantized amplitudes, followed by one 0. For example, a coefficient sequence: 9 5 3 0 1 3 0 0 1 0 . . . 0 is defined by the three coefficient clusters: 9 5 3 0, 1 3 0, and 0 1 0, the positions of non-zero and zeroes is defined by the three pairs (0, 3), (0, 2) (1, 1).

Embodiments of the present invention include coding events for clusters by codewords such that, on average, the more likely an event is to occur, the shorter the codeword used to encode the event. An event is often also called a symbol in the literature on coding. The events represent the quantized amplitudes in a coefficient cluster, and in embodiments of the invention include a three-dimensional joint position and amplitude event that may be followed by one or more one-dimensional (1-D) amplitude events for amplitudes that are not incorporated into the three-dimensional joint position and amplitude event. In the cases where the event inherently defines all non-zero valued amplitudes, there are no non-zero amplitudes remaining to be encoded for the event s and therefore, there are no following one-dimensional amplitude events. Embodiments of the present invention include encoding three-dimensional joint position and amplitude events that each includes a cluster of non-zero-valued quantized coefficients and a single zero-valued coefficient (unless the end of the sequence ends with a non-zero-valued coefficient) described by the numbers of preceding zeroes (if any), the numbers of non-zeroes in the cluster, and the number of consecutive trailing amplitude−1 coefficients at the end of the cluster preceding the final zero. Any other amplitudes are included in the following one-dimensional amplitude event(s). A three-dimensional joint position and amplitude event can be represented by three quantities, Rz, Rnz and a quantity denoted x, x≦Rnz, representing the number of trailing coefficients in that cluster that have a amplitude of 1. The triplet (Rz, Rnz, x) thus represents a three-dimensional joint position and amplitude event.

As examples, the quantized coefficient cluster:
0 0 0 6 2 1 1 1 0
can be represented as a three-dimensional joint position and amplitude event (3, 5, 3) with two remaining amplitudes 6 and 2, while the cluster:
0 0 0 6 1 2 1 1 0
can be represented by a three-dimensional joint position and amplitude event (3, 5, 2) with three remaining amplitudes 6, 1, and 2.

In some embodiment, there is one exception included to the above definition of encoding clusters—the case of Rnz=1, an isolated non-zero coefficient. In such a case, the inventors chose to have x be the amplitude of the non-zero coefficient rather than the number of trailing 1's, which in this case can only be 0 or 1. Thus, whenever Rnz=1, the coding method understands that in an event (Rz, 1, x), x is the amplitude of the non-zero coefficient.

In some embodiments of the invention, one other exception was added to the above definition of encoding clusters—the case of Rnz=2. For such other exception, let x indicates which of the two non-zero coefficients have an amplitude of 1, in a manner shown in FIG. 1, which shows Table 1 of the value of x for different patterns for the event (Rz, 2, x), where '*' stands for a non-1 quantized amplitude.

In some embodiments of the invention, for the case of Rnz>1, the quantized amplitudes other than those that are indicated by the 'x' event in the three-dimensional joint position and amplitude event are coded by a one-dimensional amplitude code applied in a reverse (decreasing spatial frequency) scan order to the forward, e.g., forward zigzag scan order. In other words, the coding starts from the last non amplitude−1 in the cluster and moves toward the lower frequency non-zero amplitude.

Note that any of these amplitudes may be value 1 except the first encountered in the reverse scan order, i.e., the last non-1 amplitude in the cluster. In some embodiments, the last non-1 amplitude in the cluster is coded as the amplitude minus 1 to further shorten the codeword (on average) since the last non-1, non-zero amplitude must be larger than 1 otherwise it would be indicated by the 'x' event.

In some embodiments, for each cluster, each of the three-dimensional joint position and amplitude events and any associated one-dimensional amplitude events are each assigned a codeword to achieve compression such that, on average, the more likely to occur an event is, the shorter codeword used to encode the event. The coding maps events to codewords. These mappings are based on statistics of events. These statistics may be pre-determined according to typically occurring images, or may be adaptively determined from the image data.

In addition to the quantized amplitudes, the signs of the quantized coefficients also are coded according to some sign coding method. Alternatively, the sign may be incorporated into the code mappings.

In some embodiments, as is common, the mappings are defined by variable length code (VLC) tables. Thus, the mapping for a single cluster is according to a three-dimensional table for three-dimensional joint position and amplitude coding and a one-dimensional table for each one dimensional amplitude event, if any, to be coded for the cluster.

Context Adaptation

Instead of using a single 3-D VLC mapping and possibly one or more 1-D VLC code mappings for encoding each cluster, embodiments of the present invention use sets of VLC mappings, and switches between the code mappings based one or more context-based selection criteria, wherein by a context-based criterion is meant a criterion that during encoding is known or derivable from one or more previously encoded items of information. Context is thus based on one or more properties of previously coded coefficients that are related to where the coding occurs within the block being coded and/or to one or more properties related to already coded image blocks surrounding the block being coded. Either the position coding or the amplitude coding or both the position coding and the amplitude coding can include VLC mapping switching. Hence, one embodiment includes two sets of VLC mappings: one for position coding, and the second for amplitude coding.

Each VLC mapping can be represented by a table. Thus, throughout this description, the term "table" should be understood to include not just a table, but broadly any form of VLC mapping that provides the codeword for the event being coded. Furthermore, as is common in the art, some events that typically are not very likely to occur are encoded by a fixed codeword plus some escape code to indicate that a fixed length codeword is being used. This provides for a smaller code mapping.

Each of the sets of VLC tables is designed to provide best compression for coefficients that follow a certain statistical distribution. With thus designed multiple sets of VLC tables, compression of the coefficient sequence may be improved by predicting the distribution of next to-be-coded coefficients based on information derivable from previously coded coefficients, and coding the next to-be-coded coefficients using the corresponding VLC tables. The information derivable from previously coded coefficients is called context herein.

In some embodiments of what we call Context Adaptive Hybrid Variable Length Coding (CAHVLC), in which clusters positions are encoded, e.g., by one of a pre-selected set of multidimensional position VLC mappings, and remaining to-be-encoded amplitudes are encoded by one a pre-selected set of VLC amplitude mappings, for contexts are exploited in predicting the coefficient distribution and determining VLC tables. These are:

Context 1: the Cluster Sizes in Nearby Block(s)

The first context includes an indication of the number of non-zero quantized coefficients in clusters in at least one previously encoded neighboring block, e.g., the average number of non-zero quantized coefficients clusters in one or more previously encoded neighboring blocks. In some embodiments, these numbers are used to predict the number of non-zero coefficients in clusters in the presently being coded block. Some embodiments including encoding the quantized coefficients of blocks of an image block row by block row in a top to bottom order, and encoder the blocks within a row block by block from left to right. In one such embodiment, the number of non-zero coefficients in the next to-be-coded block—called the currently being coded block and also the current block, such a block denoted X, is predicted by the average number of non-zero coefficients in neighboring already encountered, e.g., already coded blocks. In some embodiments, the quantity used to predict the number of non-zero coefficients in clusters in the current block X included the average number of non-zero coefficients in the clusters in the block above X denoted block A, and in the block to the left of block X, block B. FIG. 2 shows the block X and its already coded neighboring blocks A and B.

In alternate embodiments, a weighed average of the number of non-zero coefficients in clusters of neighboring already encountered blocks is used. Again referring to FIG. 2, previously coded blocks C and D that are diagonally above and to the left of X, and diagonally above and to the right of X also are included. Therefore, denoting the prediction value of Rnz by $\check{R}nz$, and denoting which block by a subscript, on one embodiment, $$\check{R}nz_X = \tfrac{1}{2}(\text{Ave}\{Rnz_A\} + \text{Ave}\{Rnz_B\}).$$

In another embodiment, $$\check{R}nz_X = w_A \text{Ave}\{Rnz_A\} + w_B \text{Ave}\{Rnz_B\} + w_C \text{Ave}\{Rnz_C\} + w_D \text{Ave}\{Rnz_D\},$$

where $w_A$, $w_B$, $w_C$, and $w_D$ denote the weights for blocks A, B, C and D, respectively, $w_A + w_B + w_C + w_D = 1$, and Ave$\{\cdot\}$ denotes the average within a block. In some embodiments, $w_A = w_B$, $w_C = w_D$ and the ratios of $w_A$ or $w_B$ to $w_C$ or $w_D$ is approximately $\sqrt{2}$ to 1, so that $w_A = w_B = 0.293$, and $w_C = w_D = 0.207$. In another embodiment, approximations to these weights are used.

Contexts 2 and 3: the Sizes of Clusters and how Sparse are the Clusters within the Block The second and third contexts include the sizes of neighboring clusters and how sparse such clusters are as indicated by the run lengths of consecutive zero-valued quantized coefficients preceding neighboring non-zero quantized coefficient clusters. In some embodiments, the distribution of the run-length of non-zero quantized coefficients of the next to-be-coded quantized coefficient cluster is predicted by the run-length of non-zero quantized coefficients of the most recently coded cluster(s) in the block. Furthermore, the distribution of the run-length of zero-values quantized coefficients preceding the next to-be-coded coefficient cluster is predicted by the maximum run-length of zeros among all the previously coded clusters in the block, assuming a typical zigzag scan ordering of quantized transform coefficients.

Context 4: the Amplitudes within the Clusters

The fourth context includes the amplitudes of previously coded non-zero quantized coefficients within the cluster of non-zero amplitudes being coded. Assume again the normal forward zigzag ordering of quantized coefficients towards higher spatial frequencies as defined by the particular transform used, and consider a reverse ordering thereof. In some embodiments, the amplitudes of non-zero coefficients in a cluster are coded in a reverse zigzag scan order, and the distribution of amplitudes of the remaining to be coded amplitudes in a particular cluster is predicted by the maximum amplitude of the previously coded non-zero coefficients in that cluster.

Rationale for Using these Contexts

The rationale for using the above-described three contexts in predicting the number of clusters in a block, the size of clusters and how sparse clusters are within a block, and the amplitude within the clusters in a block can be seen and was verified by the inventors by an experimental study on the statistics of 8×8 transform coefficients as used in the H.264/AVC coding standard.

Figure 3A:
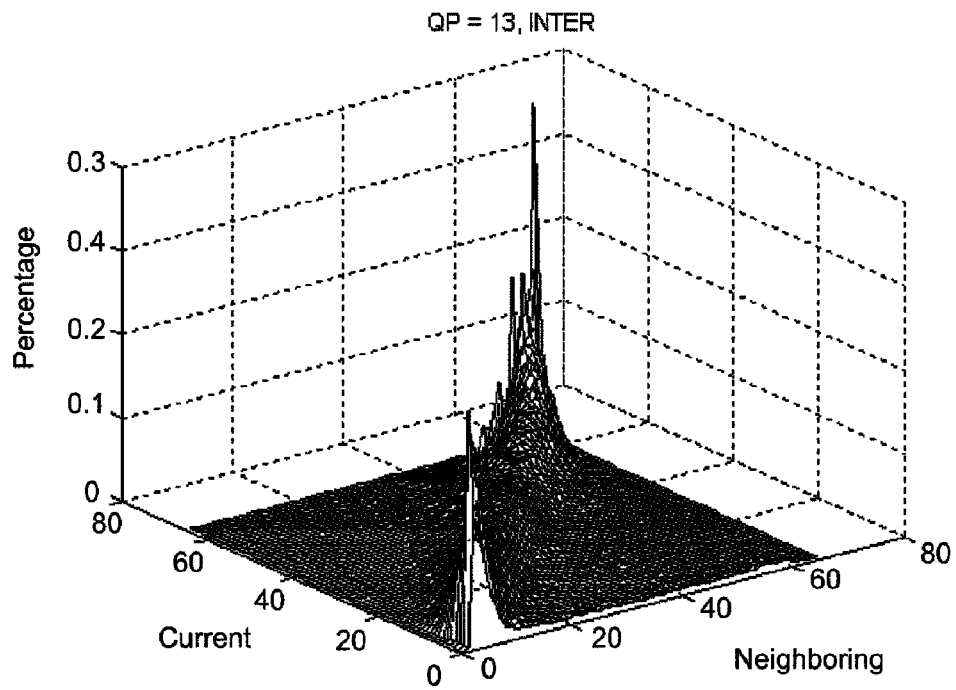
FIGS. 3A and 3B show sample plot of the correlation between the cluster sizes of a currently being coded block and the cluster sizes for neighboring blocks for the cases of inter coded blocks, and intra coded blocs, respectively, to demonstrate the rationale of using a particular type of context in embodiments of the present invention.
Figure 3B:
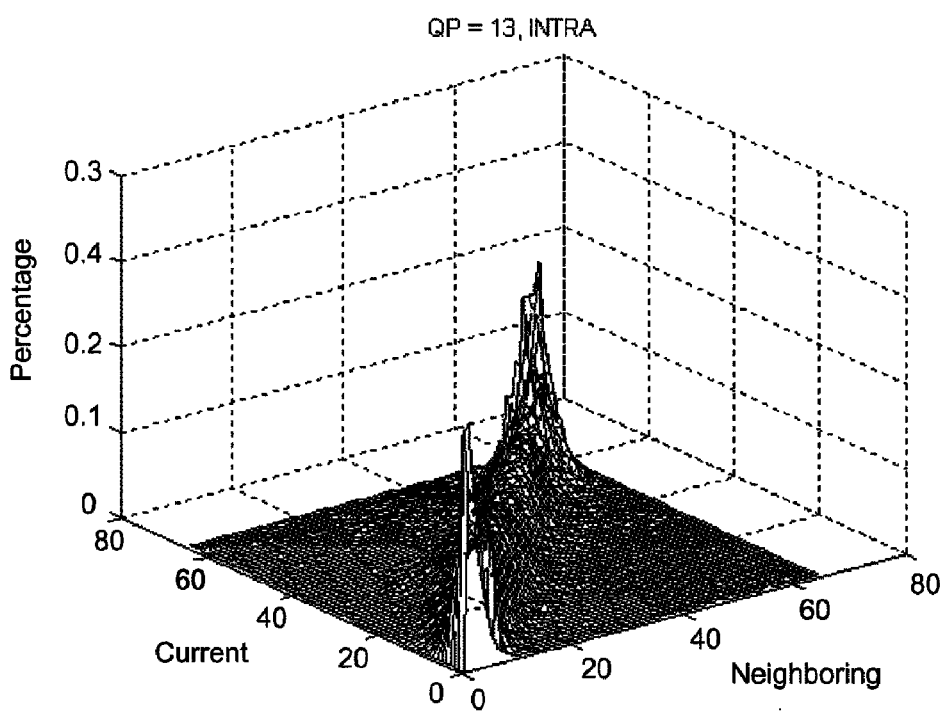

FIG. 3A shows a sample plot of the correlation between the cluster sizes of a currently being coded block and the cluster sizes in neighboring blocks for the case of inter coded blocks, while FIG. 3B shows sample plots of the correlation between cluster sizes in the currently being coded block and the cluster sizes in neighboring blocks for the case of intra coded blocks. The axis labeled "neighboring" is the average number of nonzero coefficients in the blocks above the currently-being coded block X and the in the blocks to the left of X. The "current" axis is the number of nonzero coefficients in clusters of the presently being coded block. The "percentage" axis then provides the distribution of cluster size of current blocks given the average cluster size of the two neighboring blocks A and B. This study confirms that the correlation between the cluster sizes in the currently being coded block and the cluster sizes in the neighboring ones.

This study suggests that the correlation is strong everywhere, and especially strong when the average cluster sizes in the neighboring blocks A and B is relatively very small or relatively very large, as shown by the peaks in the correlation plots of FIGS. 3A and 3B.

Figure 4B:
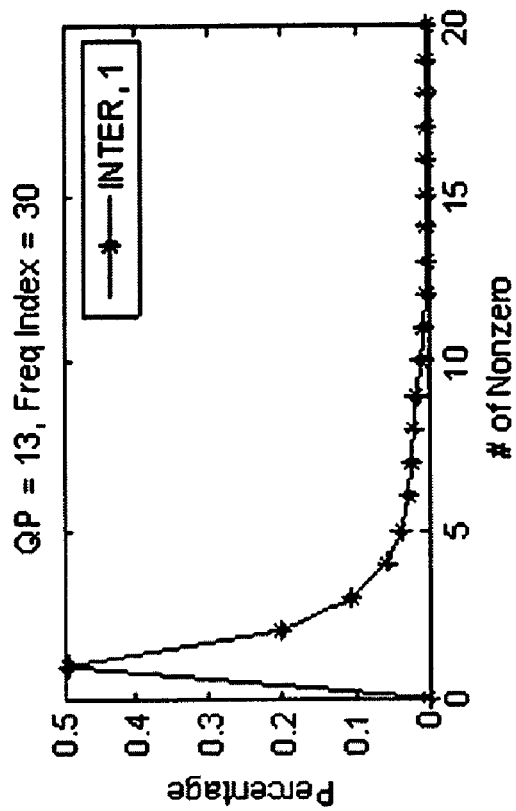
FIGS. 4A to 4F show sample plots of the correlation between the run-length of nonzero coefficients—the cluster length—of the currently being coded cluster and the run-length of nonzero coefficients of the immediately previously encoded cluster in the same block in order to demonstrate the rationale of using a particular type of context in embodiments of the present invention.
Figure 4A:
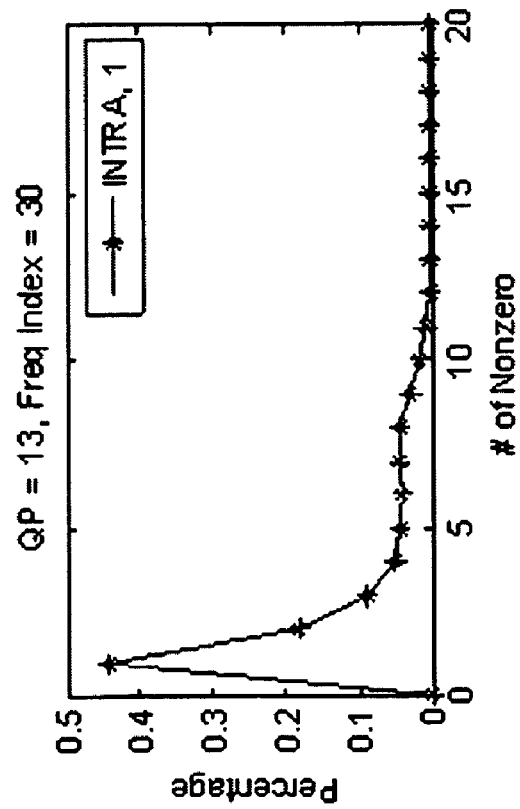
Figure 4C:
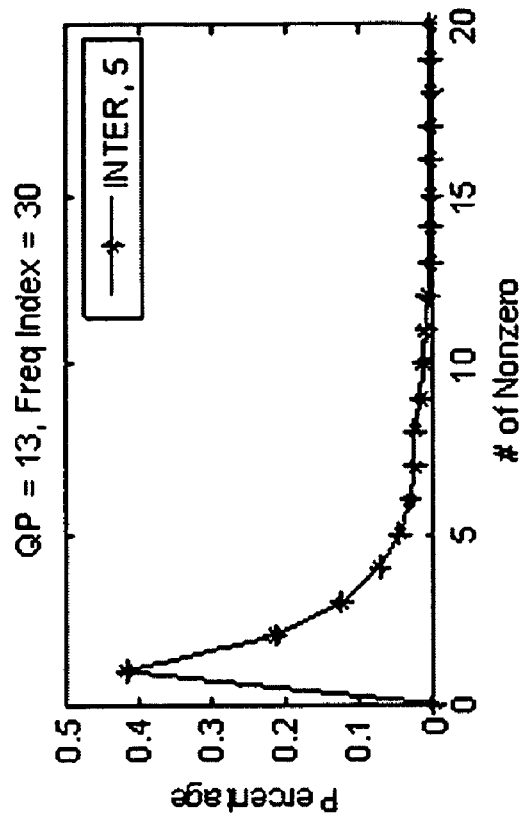
Figure 4D:
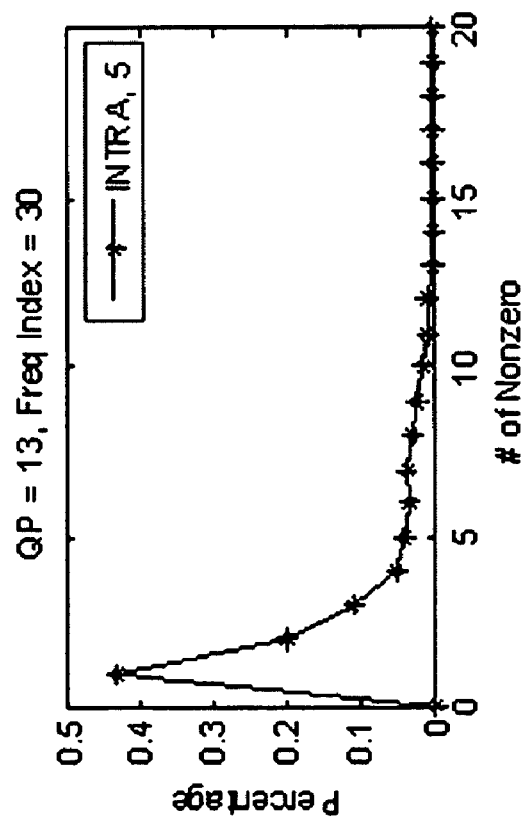
Figure 4F:
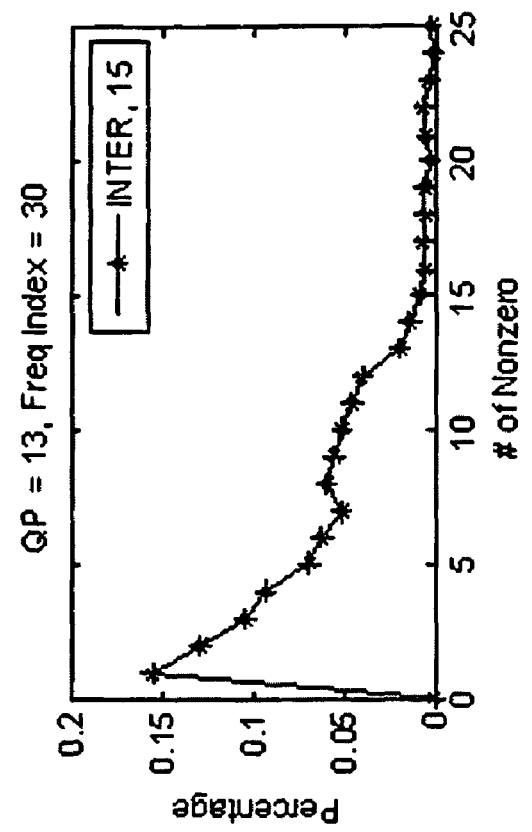
Figure 4E:
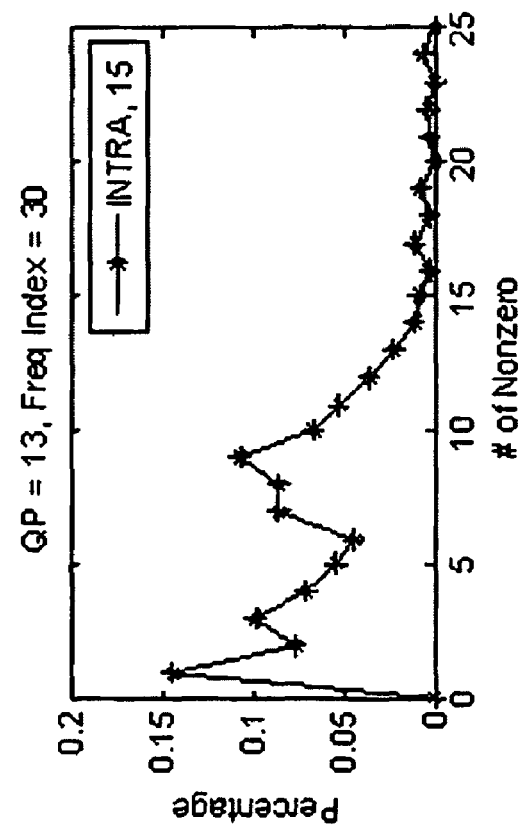

FIGS. 4A to 4F show sample plots of the correlation between the run-length of nonzero coefficients—the cluster length—of the currently being coded cluster and the run-length of nonzero coefficients of the immediately previously encoded cluster in the same block. These therefore relate to the second context. FIGS. 4A and 4B show the distribution of the cluster length of the current cluster for the cases of intra coded and inter coded blocks, respectively for a quantization parameter, denoted QP of 13 for a run length 1 for the most recent previously coded cluster within the same block. FIGS. 4C and 4D show sample plots of the distribution of the cluster length for intra coded and inter coded blocks, respectively, for a run length 5 for the most recent previously coded cluster within the same block, while FIGS. 4E and 4F show sample plots of the distribution of the cluster length for intra coded and inter coded blocks, respectively for a run length 15 for the most recent previously coded cluster within the same block.

This study suggests that the run-length of nonzero coefficients of the recently coded cluster provides context for predicting the run-length of nonzero coefficients of the next to be coded cluster, which is especially true when the run-length of the recently coded cluster is relatively small.

Figure 5A:
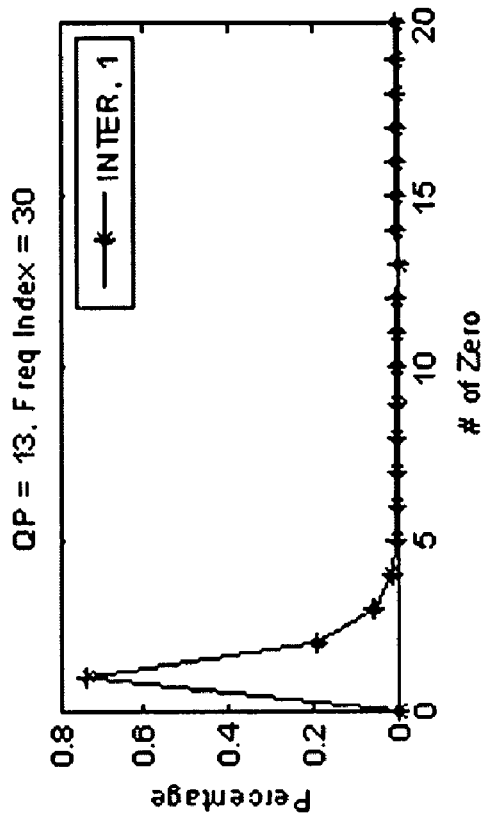
Figure 5B:
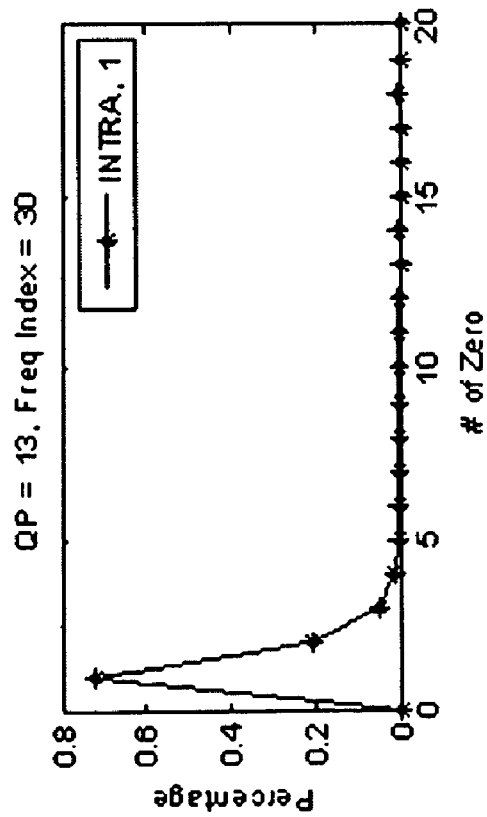
Figure 5F:
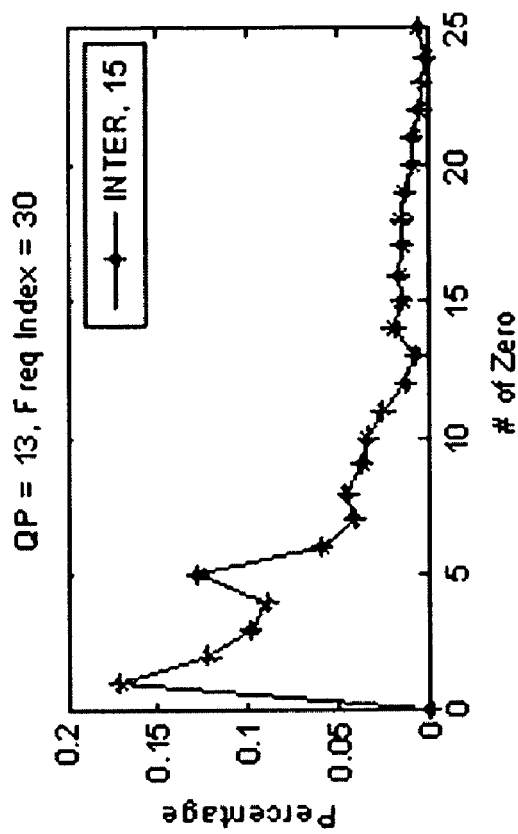
Figure 5E:
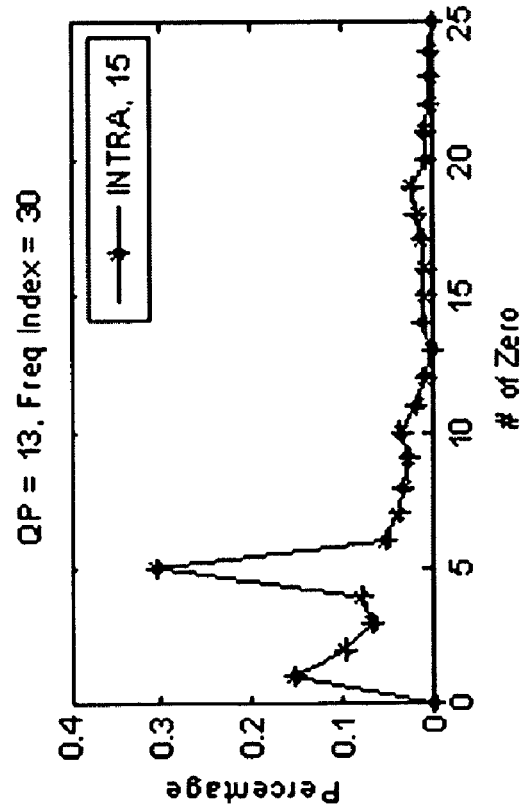

FIGS. 5A to 5F show sample plots that illustrate the correlation between the run-length of preceding consecutive zeros of the presently being coded quantized coefficient cluster and the maximum run-length of preceding zeros of all previously encoded clusters in the same block. These therefore relate to the third context. FIGS. 5A and 5B respectively show the distribution of the run-length of zeros of the currently being coded cluster for the cases of intra coded and inter coded blocks, respectively, for a quantization parameter, QP of 13 for a maximum run-length of 1 zero for all the previously coded clusters in the block. FIGS. 5C and 5D respectively show the distribution of the run-length of zeros for the cases of intra coded and inter coded blocks, respectively for a maximum run-length of 5 consecutive preceding zero-valued coefficients for all the previously coded clusters in the block, while FIGS. 5E and 5F respectively show the distribution of the run-length of zeros for the cases of intra coded and inter coded blocks, respectively for a maximum run-length of 15 consecutive preceding zero-valued coefficients for all the previously coded clusters in the block.

This study suggests that the maximum run-length of zeros of the previously coded clusters provides context for predicting the run-length of zeros of the next to be coded cluster, which is especially true when the maximum run-length of all previously coded clusters is relatively small.

Method of Coding a Sequence of Quantized Coefficients

Figure 6:
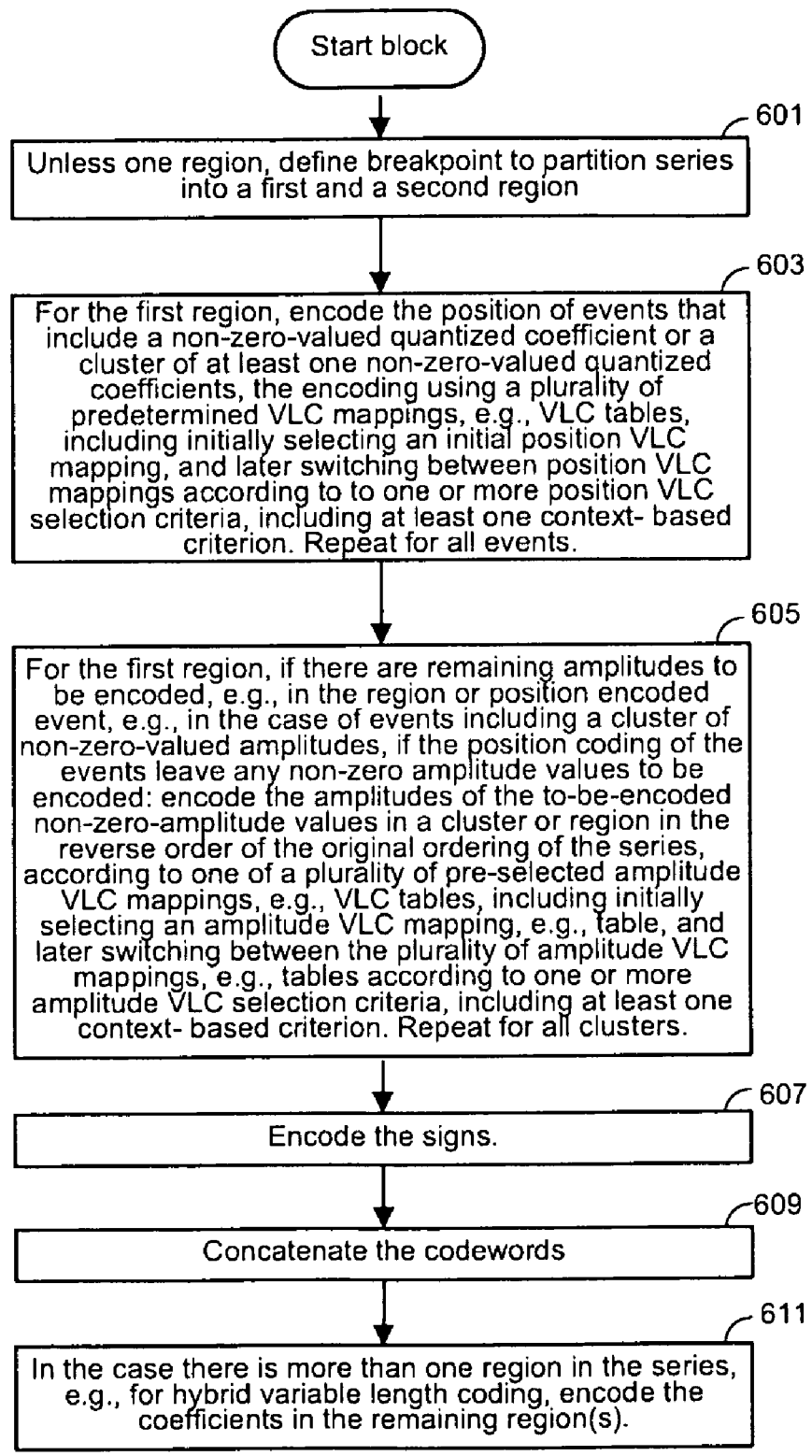
FIG. 6 shows a simplified flowchart of a method embodiment of coding an ordered sequence of quantized coefficients of an image block.

FIG. 6 shows a simplified flow chart of a method embodiment of coding an ordered sequence of quantized coefficients of an image block, e.g., a method of operating a coding apparatus, e.g., a processing system to code the ordered sequence. In some embodiments, the method is a hybrid coding method and includes in 601 selecting a breakpoint to partition the series into a first region and a second region. The first region may be the whole sequence, i.e., in some embodiments, only a single region is included.

In 603, for the first region—the whole region if not hybrid or the breakpoint is at the end—the method includes encoding the position of events, each including a non-zero-valued quantized coefficients or, for some embodiments, including a cluster of one or more non-zero-valued quantized coefficients. The encoding uses one of a plurality of predetermined VLC mappings such as VLC tables, including initially selecting an initial position VLC mapping, e.g., VLC table from the set of predetermined VLC mappings, and when not the initial case, determining whether to switch code mappings and switching between position VLC mappings, e.g., tables according to one or more position VLC selection criteria, including at least one context-based selection criterion. Step 603 is carried out for all events in the first region.

In 605, for the first region, if there are remaining amplitudes to be encoded in the region, of, if step 605 is carried out before all position coding for all events has occurred, if there are remaining amplitudes to be encoded in the encoded event, e.g., in the case of events including a cluster of non-zero-valued amplitudes, if the position coding of the events leave any non-zero amplitude values to be encoded, encoding the amplitudes of the to-be-encoded non-zero-values. This can be done event by event, or in some embodiments, after all position encodings of all events have occurred. In general, the amplitude encoding of to-be-encoded amplitudes in a cluster is carried out in the reverse order of the original ordering of the series, and is according to one of a plurality of pre-selected amplitude VLC mappings, e.g., VLC tables, including initially selecting an amplitude VLC mapping, e.g., table, and later switching between the plurality of amplitude VLC mappings, e.g., tables according to one or more amplitude VLC selection criteria, including at least one context-based criterion; repeat for all to-be-encoded amplitudes. Step 605 thus encoded all events in the first region whose positions are encoded in step 603.

In 607, the method includes encoding the signs of the non-0 amplitudes.

In 609, the method includes concatenating the codewords.

If the method includes defining one or more breakpoints to define two or more regions, e.g., two regions, the method includes in 611 to encode the coefficients in the remaining region(s). In some embodiments, conventional 2-D variable length coding is used for encoding the second region.

Different embodiments include different position and different amplitude context adaptive coding methods.

Figure 7:
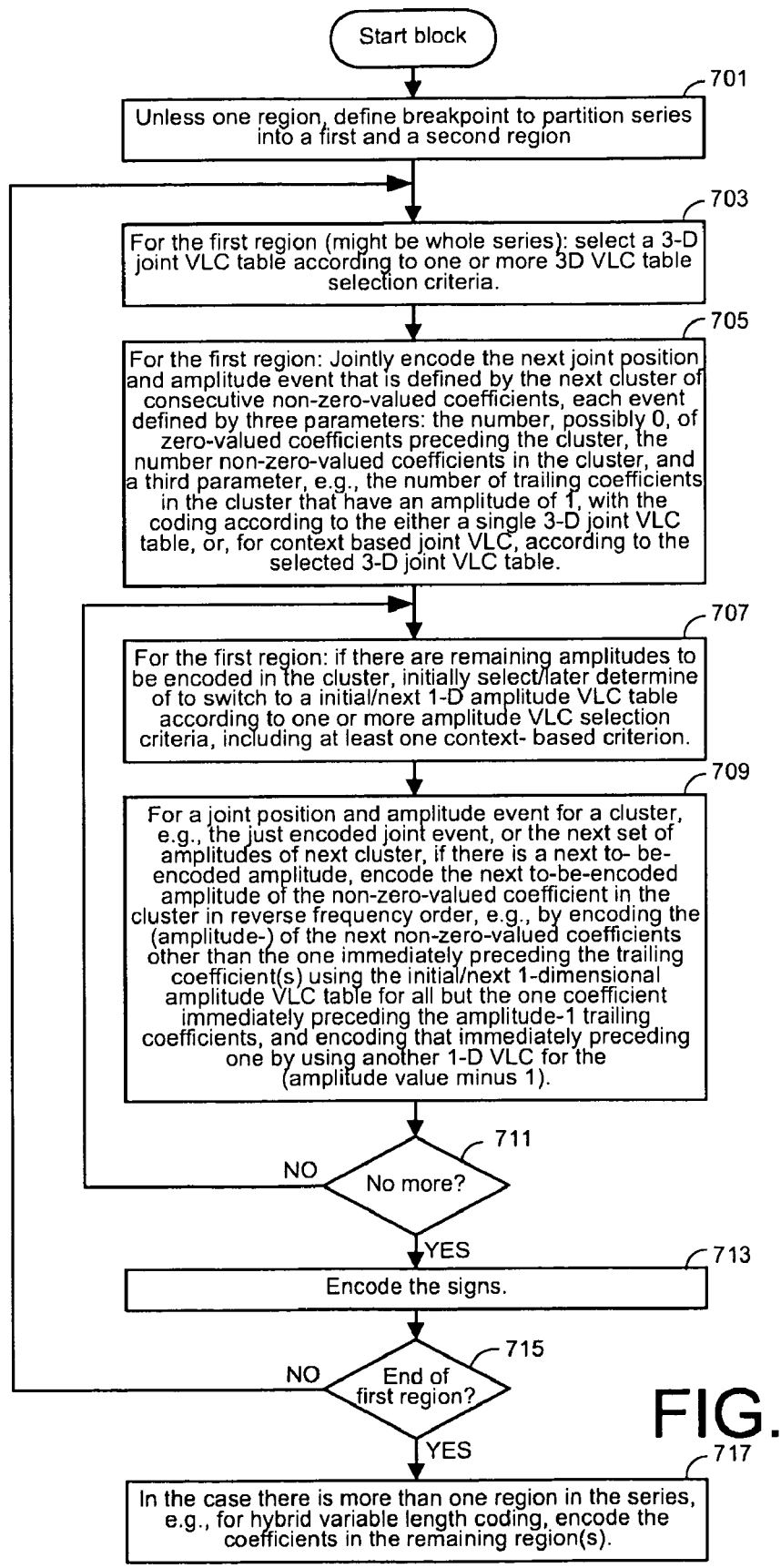
FIG. 7 shows a simplified flowchart of some embodiments of context adaptive coding that include position mapping using a plurality of three-dimensional position VLC mappings, with context based switching of the tables.

FIG. 7 shows a simplified flowchart of some embodiments that include position mapping using a plurality of three-dimensional position VLC mappings, with context based switching of the tables.

The method includes, in the case of hybrid coding, step 601 of selecting a breakpoint to partition the series into a first region and a second region. The first region may be the whole region. The method includes in 703 selecting a three-dimensional VLC mapping, e.g., 3-D VLC table to use for the next cluster using one or more 3-D VLC table selection criteria.

Consider the codewords being formed from a particular block of image data. In one embodiment, initially, step 703 includes selecting an initial 3D VLC table according to one or more initial VLC selection criteria. In some embodiments, the initial VLC table is selected based one or more initial position criteria, including the average number of non-zero coefficients in one or more previously encoded blocks that are neighbors to the particular block, i.e., based on the first above-described context. In alternate embodiments, one or more alternate or additional other coding parameters are used to select the first table. Such other coding parameters include one or more of a quantization step size, e.g., quantization parameter denoted QP, and/or whether the particular block is an intra-coded block or an inter-coded block.

The method includes in 705 jointly encoding, according to the selected three-dimensional VLC mapping, a three-dimensional joint position and amplitude event that includes a cluster of non-zero-valued quantized coefficients and a single ending zero-valued coefficient—unless the end of the sequence ends with a non-zero-valued coefficient—described by a set of three parameters including: 1) the number, which can be zero, of preceding consecutive zero-valued quantized coefficients preceding the cluster, 2) the numbers of non-zero-valued quantized coefficients in the cluster, and 3) a third parameter that for some embodiments, in some cases indicates the number of consecutive trailing amplitude-one quantized coefficients at the end of the cluster preceding the final zero-valued quantized coefficient of the cluster. In some embodiment, in the case there is only one non-zero amplitude in the cluster, the third parameter indicates the amplitude of the non-zero-amplitude coefficient. In some embodiments, in the case that there are two non-zero amplitude coefficients in the cluster, the third parameter is indicative of which if any of the two non-zero amplitude coefficients in the cluster have an amplitude other than 1.

Other than initially, step 703 of selecting the next 3-D VLC mapping, e.g., coding table occurs after coding a current coefficient cluster and before coding the next cluster. In some embodiments, the 3-D VLC mapping selection criteria include one or both of two context-based parameters: the run-length of non-zero coefficient of the recently coded cluster, i.e., the second above-described context, and/or the maximum run-length of zero coefficients of all previously coded clusters, i.e., the third above-described context. In some embodiments, a table switch is considered when the value of either of the context-based parameters changes, and a decision to switch is according a pre-defined change detection criterion, e.g., using thresholds for each context-based parameter.

FIG. 8 shows one example of threshold based selection of 3-D VLC tables presented as Table 2 that shows how the method selects one of 36 VLC tables denoted VLCqr, where integers q, r=0, 1, . . . , 5 for three-dimensional joint position and amplitude coding according to where two contexts are in relation to two pre-defined 3D table switching thresholds: a maximum zero run-length of previous cluster threshold, denoted zi, where i=1, 2, . . . , 5 and a non-zero run-length of the recent cluster Rnz_pre threshold denoted nj, where j=1, 2, . . . , 5, where $0<z_i<z_j<63$, and $1<n_i<n_j<64$, for i<j.

In some embodiments, the 3D VLC table switching is restrained to a monochrome direction from the top-left to the bottom-right. In other words, a table switch occurs when either Rz_max increases or Rnz_pre decreases and the value falls into a new range according to the thresholds. In other embodiments, the 2-dimensional table switch shown in FIG. 10 is restrained to at most one-step from left to right each time based on the non-zero run-length parameter while multiple steps from top to bottom each time is allowed based on the zero run-length parameter.

In the case there are amplitudes remaining to be coded for the cluster, in the case of context sensitive amplitude coding of the remaining coefficients, the method includes in 707 selecting an initial 1-D amplitude VLC mapping, e.g., 1-D VLC table according to one or more initial amplitude VLC selection criteria, including at least one context-based criterion. The selection is in some embodiments from a set of pre-determined 1-D VLC tables. In some embodiments, the initial one-dimensional amplitude VLC table is determined based on the coded trailing-1 event and the spatial frequency region where the coefficient cluster falls. Intuitively, a VLC table that favors larger amplitudes is more likely to be a good choice in the low-frequency region than a VLC table that favors a lower amplitude in the low frequency region, even though in general, lower amplitude values are more likely to occur after quantization.

In 709, the method includes encoding the next (initially the first) still to be encoded amplitude in the cluster in reverse frequency order, that is, encoding the next amplitude of any non-zero-valued coefficient in the cluster that are not encoded by the joint event encoding, e.g., encoding the next to-be-encoded non-zero-valued coefficient in the cluster that is not an amplitude−1 trailing coefficients. In some embodiments, this is carried out by encoding the next to-be-encoded coefficient in the cluster, other than the one immediately preceding the amplitude−1 trailing coefficients, as its amplitude using a 1-dimensional amplitude VLC table, and encoding that immediately preceding one by using another 1-D VLC for the (amplitude value minus 1).

For context based amplitude VLC, the next to-be-encoded amplitude is according to initially the initial amplitude VLC table, and thereafter the next selected amplitude VLC table. If there is at least one more amplitude to be encoded (611), the method returns to 707 wherein it is determined if there should be a table switch to a different 1-D amplitude VLC table. If so, the new table is selected.

Steps 707, 709, and 711 (or 709 and 711 if the amplitude encoding is not context adaptive) of the cluster and proceeds toward the first amplitude of the cluster in the reverse ordering to the original ordering of the series. Encoding (amplitude minus 1) for the one coefficient immediately preceding the amplitude−1 trailing coefficients can reduce the code length, since it is known that it is greater than 1.

In some embodiments, the context used for determining whether to switch tables is based one or more VLC mapping selection criteria. In some embodiments, the VLC mapping selection criteria include the amplitude of the previously coded coefficient. In other embodiments, the criteria include the maximum of all previously coded coefficients in the cluster, i.e., the third above-described context. One embodiment includes defining a set of one-dimensional amplitude coding tables, one for each of a corresponding set of ranges for the maximum value of the previously coded amplitudes in the cluster, based on a set of pre-determined thresholds.

In step 709, initially with the selected initial table, one-dimensional amplitude coding begins with coding the last non-1 amplitude of the cluster, as (amplitude minus 1), and proceeds toward the first amplitude of the cluster in the reverse ordering from lowest to highest spatial frequency, e.g., in the reverse to the zigzag scan order used for the two-dimensional block of transform coefficients.

After all the amplitudes of the cluster as been encoded, in 713, the signs of the non-0 amplitudes are encoded. Flowchart elements 703 to 713 are carried out for all clusters in the first region (615).

The method includes concatenating the codewords.

If the method includes defining one or more breakpoints to define two or more regions, e.g., two regions, the method proceeds in 611 to encode the coefficients in the remaining region(s). In some embodiments, conventional 2-D variable length coding is used for encoding the second region.

The method includes concatenating the codewords.

In an alternate embodiment, the third parameter defining events for the three-dimensional encoding includes, for at least one cluster length, e.g., a cluster length of 2, an indication of which of the coefficients in the cluster have amplitude 1. In yet another embodiment, in the case the cluster length is 1, the third parameter includes an indication of the amplitude of the one non-0 quantized amplitude. How to modify the method described above and in FIG. 7 to so accommodate such 3-D encoding would be clear to one in the art, and is described in more detail, without the context-based VLC table switching, in U.S. Ser. No. 12/030,821.

Figure 9:
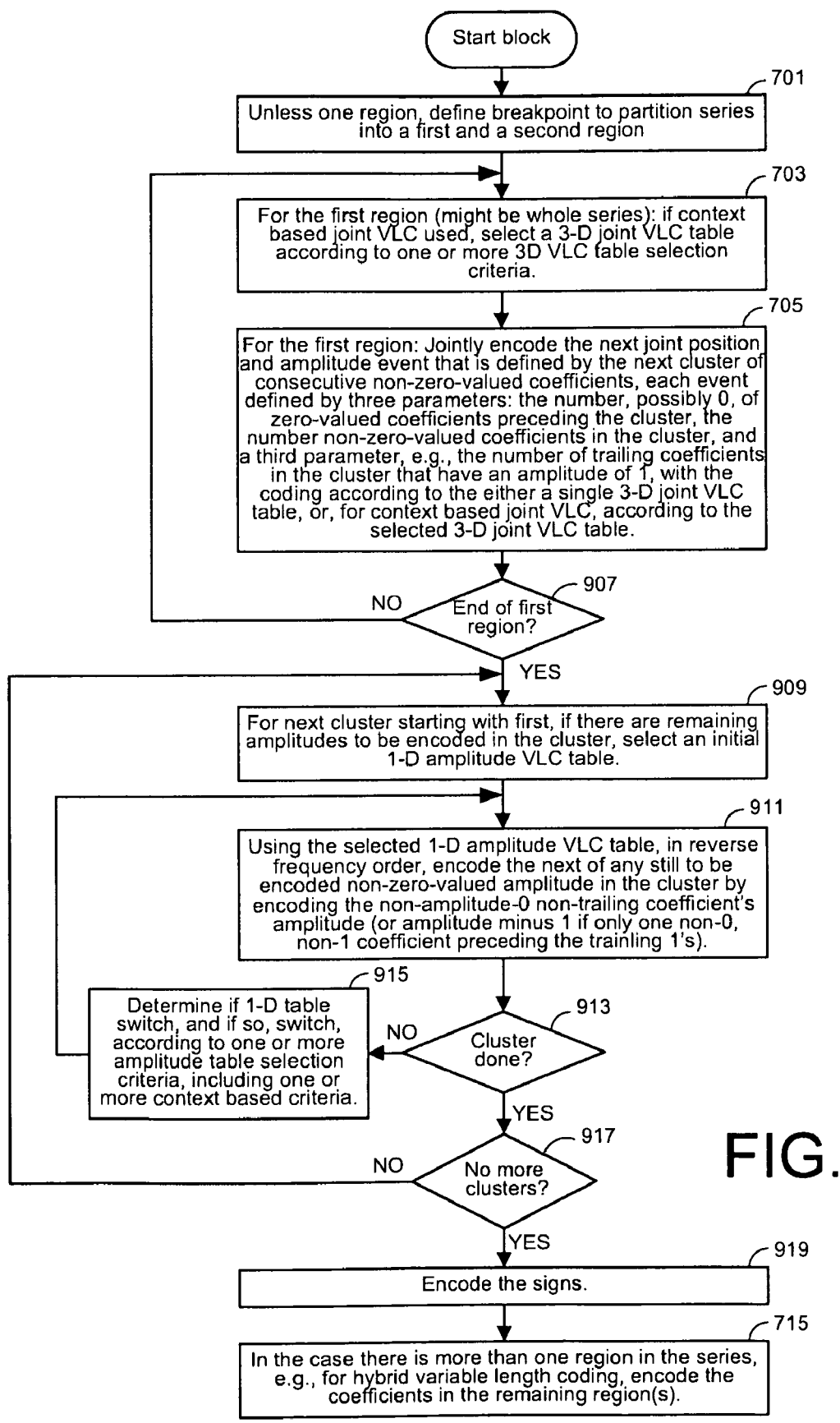
FIG. 9 shows a simplified flowchart of an embodiment of context adaptive coding that includes carrying out amplitude coding after the positions of all clusters have been coded.

Note that, because the coding of remaining amplitudes is independent of the position coding process and is performed for each coefficient cluster separately, it may be carried out either immediately following the position coding of a cluster, as shown in the flowchart of FIG. 7, or in alternate embodiments, after the positions of all coefficient clusters are coded. FIG. 9 shows a simplified flowchart of one such embodiment that includes carrying out the amplitude coding after the positions of all clusters have been coded. Steps 703 and 707 proceed until the position coding of all clusters—in the first region if hybrid coding with multiple regions. See the end of first region decision 907 and the looping back. A cluster loop including flowchart elements 909, 911, 913, 915 and 917 is repeated for each cluster in the first region to encode all the remaining to-be-encoded amplitudes in the cluster until no more clusters are encountered. Such a loop includes an individual amplitude encoding loop including flowchart blocks 911, 913, and 915. One-dimensional amplitude coding begins with coding the last non-1 amplitude of the cluster as (amplitude minus 1), and proceeds toward the first amplitude of the cluster in the reverse ordering from highest to lowest spatial frequency, e.g., in the reverse to the zigzag scan order used for the two-dimensional block of transform coefficients.

Such embodiments that first complete position coding have the advantage of providing another possible context to use for determining if to switch tables: the distribution of all quantized coefficients in the ordered series of the block. For example, if there are a large number of non-zero quantized coefficients in the ordered series, intuitively, there is a higher probability of having relatively large amplitudes in the first few coefficient clusters. One method selects the initial amplitude VLC using this context. The inventors found that this can provide better performance than carrying out the initial table selection after the initial cluster is encoded.

Assuming context adaptive amplitude coding, in 909, for the next cluster, initially the first cluster, if there are non-1 amplitudes remaining to be encoded, an initial 1-D amplitude VLC table is selected according to an initial 1-D table selection criterion, e.g., the spatial frequency position of the cluster. In 911, the next amplitude for the next cluster is encoded using the last selected—initially the first—1-D amplitude VLC table. After encoding each amplitude, if there are more amplitudes to be encoded (713) a table switch decision is made in 915 based one or more VLC mapping selection criteria. In some embodiments, the VLC mapping selection criteria include the amplitude of the previously coded coefficient. In other embodiments, the criteria include the maximum of all previously coded coefficients. One embodiment includes defining a set of one-dimensional amplitude coding tables, one for each of a corresponding set of ranges for the maximum value of the previously coded amplitudes based on a set of pre-determined thresholds.

The method proceeds then to encode the next to-be encoded amplitude.

As in the case of FIG. 7, in 919, the signs of the non-0 amplitudes in the first region are encoded. If the method includes defining one or more breakpoints to define two or more regions, e.g., two regions, the method proceeds in 717 to encode the coefficients in the remaining region(s). In some embodiments, conventional 2-D variable length coding is used for encoding the second region.

It should be noted that the context adaptive position coding process, e.g., 603 of FIG. 6, and the context adaptive amplitude coding processes, e.g., 605 of FIG. 6 are separable and may each be adopted in conjunction with other similar methods. More particularly, context adaptive one-dimensional amplitude VLC as described herein, e.g., in FIGS. 7 and 9 may be combined with a different position coding scheme, e.g., the one-dimensional, two-way position coding scheme described in incorporated by reference U.S. application Ser. No. 12/016,441, or the 2-D context adaptive method described in incorporated by reference U.S. application Ser. No. 12/016,441. Alternatively, the 3-D context adaptive position coding method described herein, e.g., in FIGS. 7 and 9 may be combined with a different amplitude coding scheme, e.g., the multi-dimensional context adaptive amplitude coding method described in incorporated by reference U.S. application Ser. No. 12/016,441. Each such different implementation has different coding performance and computation requirements.

Consider one such example of using a different context adaptive position coding method—using one-dimensional, two-way position coding. Some 1-D position coding embodiments follows the convention of coding the position of each nonzero-valued coefficient according to the number, of any, of consecutive zero-valued coefficients that precede the non-zero-valued quantized coefficient, such a number possibly 0. This parameter is denoted Run_z herein. In some embodiments, two components that relate to context information are included. The first included context component is the maximum value of Run_z of previously coded non-zero amplitude quantized coefficients. The second included context component is an index indicative of the present frequency—in the form of a present frequency sub-band index in the case that the range of spatial frequencies of the transform is broken up into frequency sub-bands, each represented by an index value. This indicates "where we are" during the position coding process. Combining these two context components provides a prediction of the variation tendency of the coefficient positions. One embodiment of the coding method ascertains whether or not to switch the VLC table based on such prediction.

FIG. 10 shows Table 3 that illustrates by way of example, how in one embodiment a VLC table is selected based upon the previous maximum run of zero-valued quantized coefficients preceding a non-zero-value (Run_z) and the present frequency index components. In FIG. 10, $VLC_p k$, k=0, 1, 2, ... denotes a particular VLC table for position coding and $I_x$, $R_y$ denote the respective selected thresholds for the frequency index and previous maximum Run_z, respectively.

Each $VLC_p$ table is a one-dimensional code mapping, e.g., code table in which each value of Run is assigned a variable length codeword.

Consider another example of using a different context adaptive amplitude coding method, e.g., the multi-category amplitude coding method disclosed in incorporated by reference U.S. application Ser. No. 12/016,441. For this, use is made of the fact that after the positions of all quantized coefficients are coded, the distribution of nonzero-valued coefficients in the coefficient series is known. This knowledge provides context information for coding the quantized amplitudes (Levels) of the nonzero-valued coefficients. To use this context, Levels are divided into three categories: If a nonzero-valued coefficient is preceded and followed by zero-valued coefficients or preceded by a zero and the final quantized coefficient, it is categorized as what we call an "isolated" Level; if a nonzero-valued quantized coefficient is preceded or followed by a zero-valued quantized coefficient but not both, it is categorized as what we call an "adjacent-to-0" Level. The third category is neither an isolated Level nor an adjacent-to-0 Level. The inventors noticed that in many ordered series, an isolated or adjacent-to-0 Level is more likely to have a small magnitude, while a nonzero-valued coefficient that is preceded and is followed by a nonzero-valued coefficient is more likely to have a larger magnitude.

Corresponding to the three categories, one embodiment of context adaptive amplitude coding of remaining to be coded amplitudes includes three phases. In the first phase, all isolated to-be-coded Levels are extracted and concatenated. Following the reverse scan order, the concatenated Level series is coded by a 3D VLC method in which every consecutive three Levels is coded as a 3-tuple using one codeword. The remaining one or two isolated Levels are coded in a second phase, together with all adjacent-to-0 Levels and following the reverse order of the series to the original increasing frequency, e.g., zigzag ordering. In such a phase, every consecutive two Levels is coded using a 2D VLC method, and, if there exists any last (one) Level, such a last Level is coded in the third phase together with all the remaining Levels, using a 1D VLC method. Within each phase, multiple VLC tables are used, and the determination of a particular VLC is in one embodiment based on the maximum magnitude of those Levels that have higher frequency indices and that have been previously coded.

Figure 11:
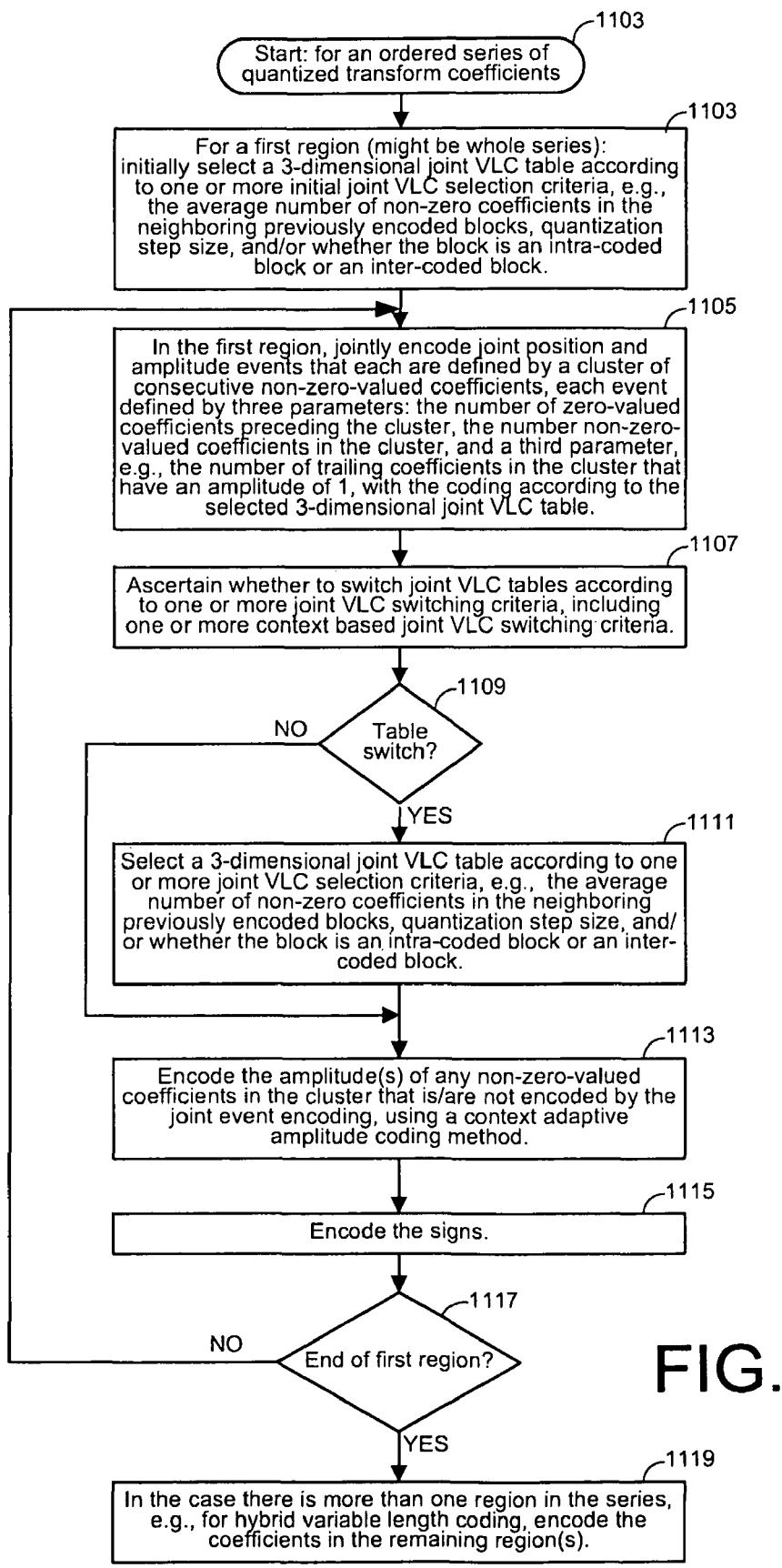
FIG. 11 shows a flowchart of one example of an alternate method embodiment of encoding.

FIG. 11 shows a flowchart of one example of an alternate method embodiment of encoding. Some of the reference numerals used in FIG. 11 might refer to steps that in other drawings have different reference numerals. The method starts in 1101 to encode an ordered series of quantized transform coefficients. Step 1103 occurs the first time for a first region (might be whole series) of the series and includes initially selecting a 3-dimensional joint VLC table according to one or more initial joint VLC selection criteria, e.g., the average number of non-zero coefficients in the neighboring previously encoded blocks, quantization step size, and/or whether the image block from where the series is determined is an intra-coded block or an inter-coded block. 1105, 1107, 1109, 1111, 1113, 1115 and 1117 are repeated until no more coefficients in the first region need be encoded. The method includes in 1105 in the first region, jointly encoding joint position and amplitude events that each are defined by a cluster of consecutive non-zero-valued coefficients. Each event is defined by three parameters: the number of zero-valued coefficients preceding the cluster, the number of non-zero-valued coefficients in the cluster, and a third parameter, e.g., the number of trailing coefficients in the cluster that have an amplitude of 1, with the coding according to the selected 3-dimensional joint VLC table. The method includes in 1107 ascertaining whether to switch the joint VLC table according to one or more joint VLC switching criteria, including one or more context based joint VLC switching criteria. If it is ascertained to switch tables (1109), in 1111, a 3-dimensional joint VLC table is selected according to one or more joint VLC selection criteria, e.g., the average number of non-zero coefficients in the neighboring previously encoded blocks, quantization step size, and/or whether the block is an intra-coded block or an inter-coded block. Else, if no table switch, 1111 is skipped. The method includes in 1113 encoding the amplitude(s) of any non-zero-valued coefficients in the cluster that is/are not encoded by the joint event encoding, using a context adaptive amplitude coding method. The method includes in 1115 encoding the signs. In 1117 it is ascertained whether or not the end of first region has been reached. If not, the process returns to 1105 to jointly encode the position of the next event, else, if the end of the first region has been reached, and in the case there is more than one region in the series, e.g., for hybrid variable length coding, the quantized coefficient(s) in the remaining region(s) is/are coded in 1119.

Figure 12:
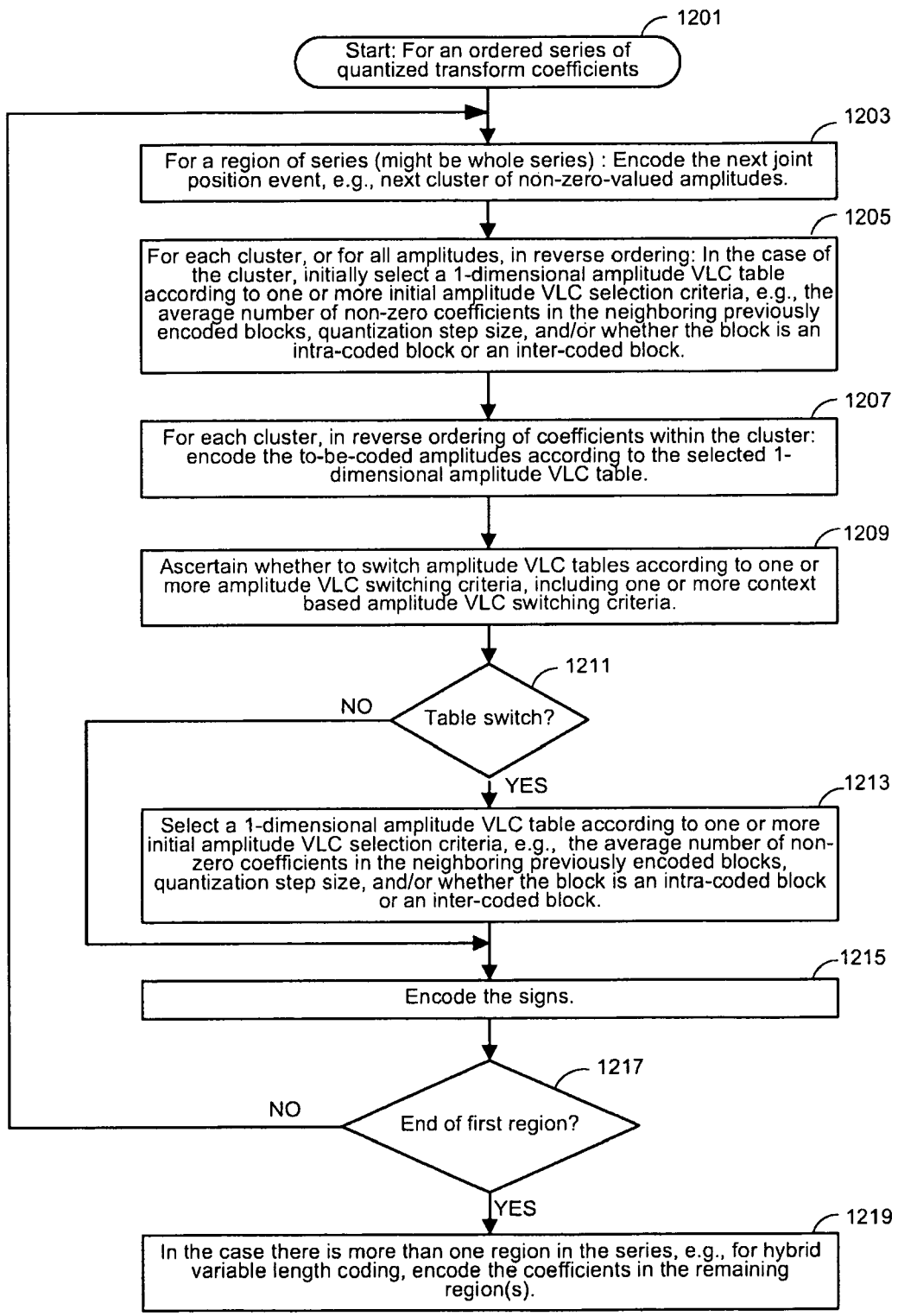
FIG. 12 shows a flowchart of another example embodiment of a method of encoding.

FIG. 12 shows a flowchart of another example embodiment of a method of encoding. Some of the reference numerals used in FIG. 12 might refer to steps that in other drawings have different reference numerals. The method starts in 1201 and is for an ordered series of quantized transform coefficients from a block of image data. Steps 1203 to 1217 occur for a region of the series—this region might be the whole series. The method includes in 1203 encoding the next joint position event in the first region, e.g., next cluster of non-zero-valued amplitudes. The method starts in 1205, for each cluster, or for all amplitudes, in reverse ordering, encoding the amplitudes: In the case of a cluster, the method includes in 1205 initially selecting a 1-dimensional amplitude VLC table according to one or more initial amplitude VLC selection criteria, e.g., the average number of non-zero coefficients in the neighboring previously encoded blocks, the quantization step size, and/or whether the block is an intra-coded block or an inter-coded block. The method includes in 1207, for each cluster, in reverse ordering of coefficients within the cluster: encoding the to-be-coded amplitudes according to the selected 1-dimensional amplitude VLC table. The method includes in 1209 ascertaining whether to switch amplitude VLC tables according to one or more amplitude VLC switching criteria, including one or more context based amplitude VLC switching criteria. If there was table switch ascertained (1211), in 1213 a 1-dimensional amplitude VLC table is selected according to one or more initial amplitude VLC selection criteria, e.g., the average number of non-zero coefficients in the neighboring previously encoded blocks, the quantization step size, and/or whether the block is an intra-coded block or an inter-coded block. If there is no table switch ascertained, 1213 is skipped. The method includes in 1215 encoding the signs of the non-zero amplitude quantized coefficients. In 1217 it is ascertained whether or not the end of first region has been reached. If not, the process returns to 1203. Else, if the end of the first region has been reached, and in the case there is more than one region in the series, e.g., for hybrid variable length coding, the quantized coefficient(s) in the remaining region(s) is/are coded in 1219.

Decoding

While the above descriptions were mostly of coding methods, those in the art will understand that the present description also leads to decoding methods and apparatuses that decode a bitstream that was coded by any of the coding embodiments described herein. The decoding method includes accepting a bitstream including codewords encoded by the coding method described above, including recognizing codewords in the bitstream and decoding the codewords. The codewords are decoded using VLC tables that are selected according to one or more context-based selection criteria as used in the coding. Because any decoded item of information can be used by a coder in the decoding process, during decoding of a codeword, any context-based selection criterion is known or derivable from one or more previously decoded items of information. For example, any table switching uses information of previously decoded coefficients, e.g., of block(s) adjacent to the blocks being coded, and/or previously decoded coefficients within the block being decode, which VLC table was used for a particular codeword is included in the decoding method according to the same criterion as would be used by an encoding method.

In the case the coding method is a hybrid method, such that the series includes a first region and one or more other regions, the coding method further includes encoding the coefficients in the remaining region(s). The decoding method further includes decoding those of the codewords that are of the remaining regions.

Apparatus Embodiments

Particular embodiments include an apparatus comprising: an encoder configured to encode the position and amplitudes of clusters of non-zero-valued coefficients in an ordered series of quantized transform coefficients of a block of image data, the series having a most likely-to-occur amplitude, e.g., 0, and at least one other amplitude including a next-to-most likely-to-occur amplitude, e.g., 1, the encoder including a joint encoder configured to encode in a first region of the series, joint position and amplitude events that each are defined by a cluster of consecutive non-zero-valued coefficients, each event defined by three parameters: the number of zero-valued coefficients preceding the cluster, the number of non-zero-valued coefficients in the cluster, and a third parameter indicative of the number of trailing non-zero-valued coefficients that have amplitude 1 in the cluster, with the coding according to a 3-dimensional joint VLC table. In some embodiments, for a cluster length of 2, the third parameter indicates which of the two quantized coefficients has amplitude 1. In some embodiments, for a cluster length of one, the third parameter indicates what the value of the non-zero amplitude.

The apparatus further includes an amplitude encoder configured to encode the non-zero valued coefficients that were not encoded by the joint encoding, e.g., encoding other than the amplitude–1 trailing coefficients. In some embodiments, the coefficient amplitude encoder uses a 1-D VLC for each value indicative of the amplitude. One embodiment separately encodes the non-zero-valued coefficients other than that adjacent to the training amplitude–1 coefficients, then encodes a value, the (amplitude value minus 1) of the adjacent non-zero coefficient since that coefficient has amplitude greater than 1.

The apparatus further includes a sign encoder configured to encode the sign of the non-zero-valued coefficients in the clusters.

One embodiment of the encoder that encodes using a hybrid variable length coding method is configured to encode, in the case there are two or more regions defines for the ordered series, the coefficients of the remaining regions.

The encoder further includes a concatenator configured to concatenate the resulting codewords.

Figure 13:
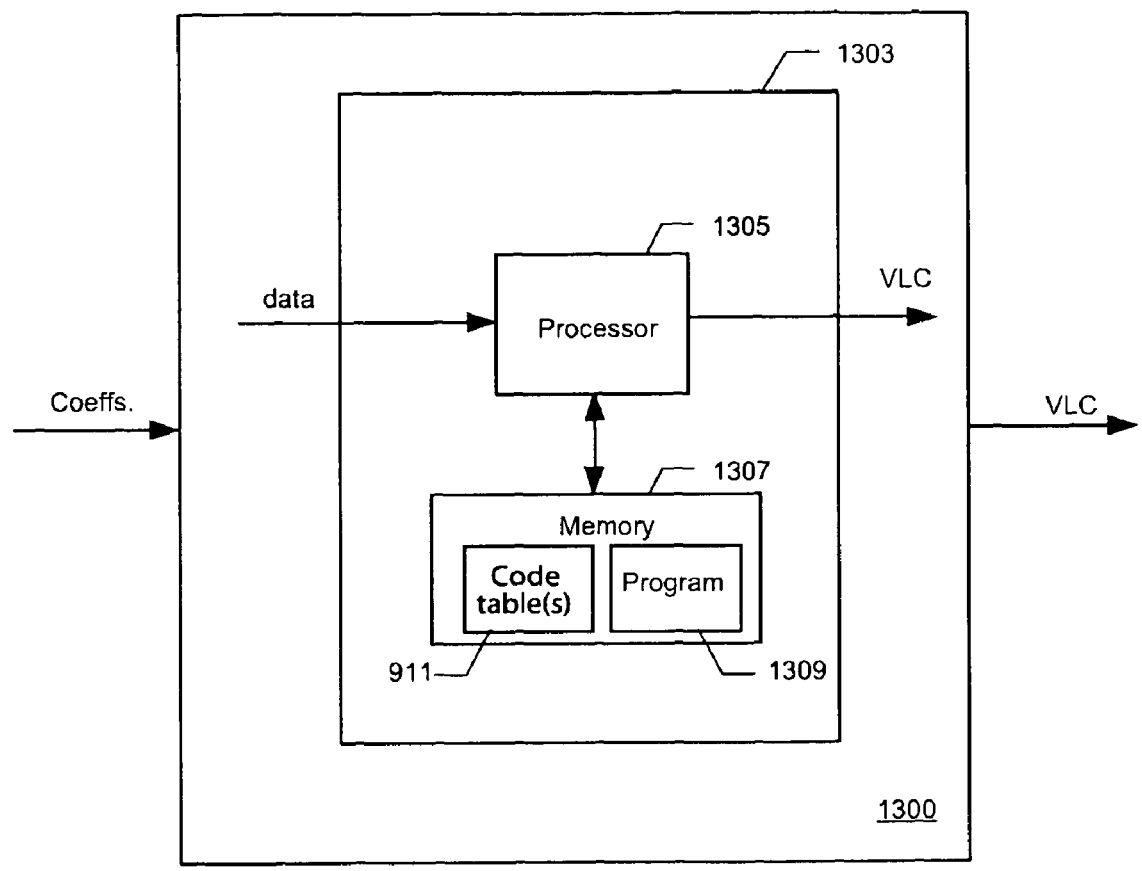
FIG. 13 shows an embodiment that includes an apparatus that is configured to implement a coding method as described herein.

FIG. 13 shows an embodiment that includes an apparatus 1300 that is configured to implement a coding method as described herein, e.g., as described in FIG. 6. Apparatus 1300 includes processing system 1303 that includes one or more processors 1305 and a memory 1307. A single processor is shown in FIG. 13 and those in the art will appreciate that this may represent several processors. Similarly, a single memory subsystem 1307 is shown, and those in the art will appreciate that the memory subsystem may include different elements such as RAM, ROM, and so forth. In addition, the memory subsystem is meant to include any non-volatile memory storage such as a magnetic or optical storage component. A computer program 1309 is included and is loaded into the memory 1307. Note that at any time, some of the programs may be in the different parts of the memory subsystem, as will be understood by those in the art. The program 1309 includes instructions to instruct the processor to implement, in different versions, the respective different coding methods including the respective different position coding methods and respective different amplitude coding methods described herein for the first region and if a hybrid coding method the remaining regions. In the embodiment shown, the method uses one or more coding tables 1311 in the memory subsystem 1307.

Figure 14:
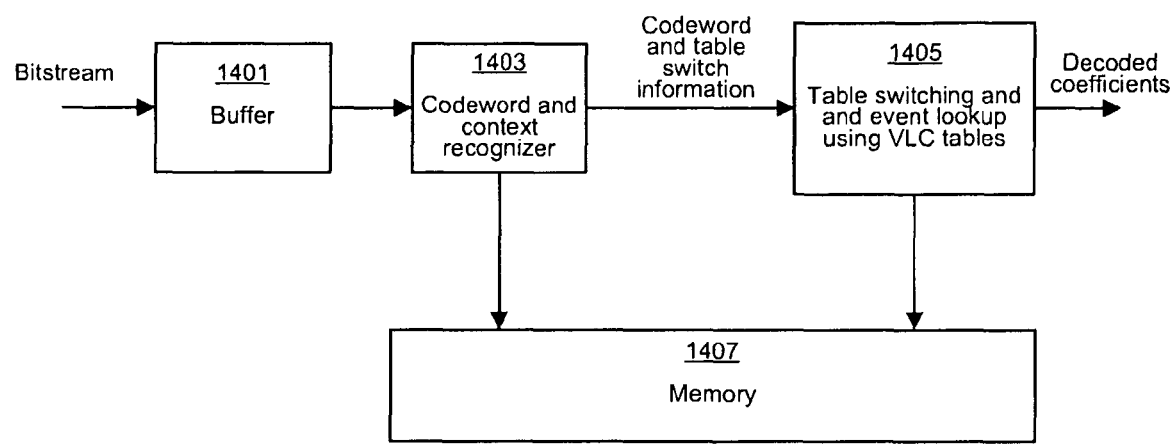
FIG. 14 shows one embodiment of a decoder.

FIG. 14 shows one embodiment of a decoder. The apparatus includes an input buffer 1401 that is configured to accept a bitstream encoded by a compression method that includes any of the coding method embodiments described herein.

The output of the buffer acts as input to a codeword recognizer and context determiner 1403 that accepts the bits of the input bitstream and that is configured to determine which of the coding tables the codeword is from, e.g., based on context. A decoder 1405 is coupled to the codeword recognizer and context determiner 1403 and is configured to determine the data for the codeword recognized by the codeword recognizer, including, for any of the position coding methods described herein, a codeword recognizer that can ascertain the position of the nonzero or zero valued coefficients, depending on the position coding used. The codeword recognizer also recognizes other codewords that encode other parameters encoded by the coding method, including the nonzero values, an indication of the number of trailing coefficients, and so forth. The codeword recognizer and context determiner 1403 also provides information to enable a decode 1405 to determine which code table, used as a decoding table to use. In some embodiments, the decoder 1405 includes a lookup device that looks up the appropriate decoding table stored in a memory 1407. That table provides the event for at least some of the codewords of the set of codewords. Other codewords may include an "escape" code, so that decoding is by other than a table lookup method.

While in the embodiment shown in FIG. 14, the memory is shown separate from the lookup device (decoder) 1405, those in the art will understand that in other embodiments, the lookup device 1405 includes memory for the tables, and such other embodiments are included herein.

Figure 15:
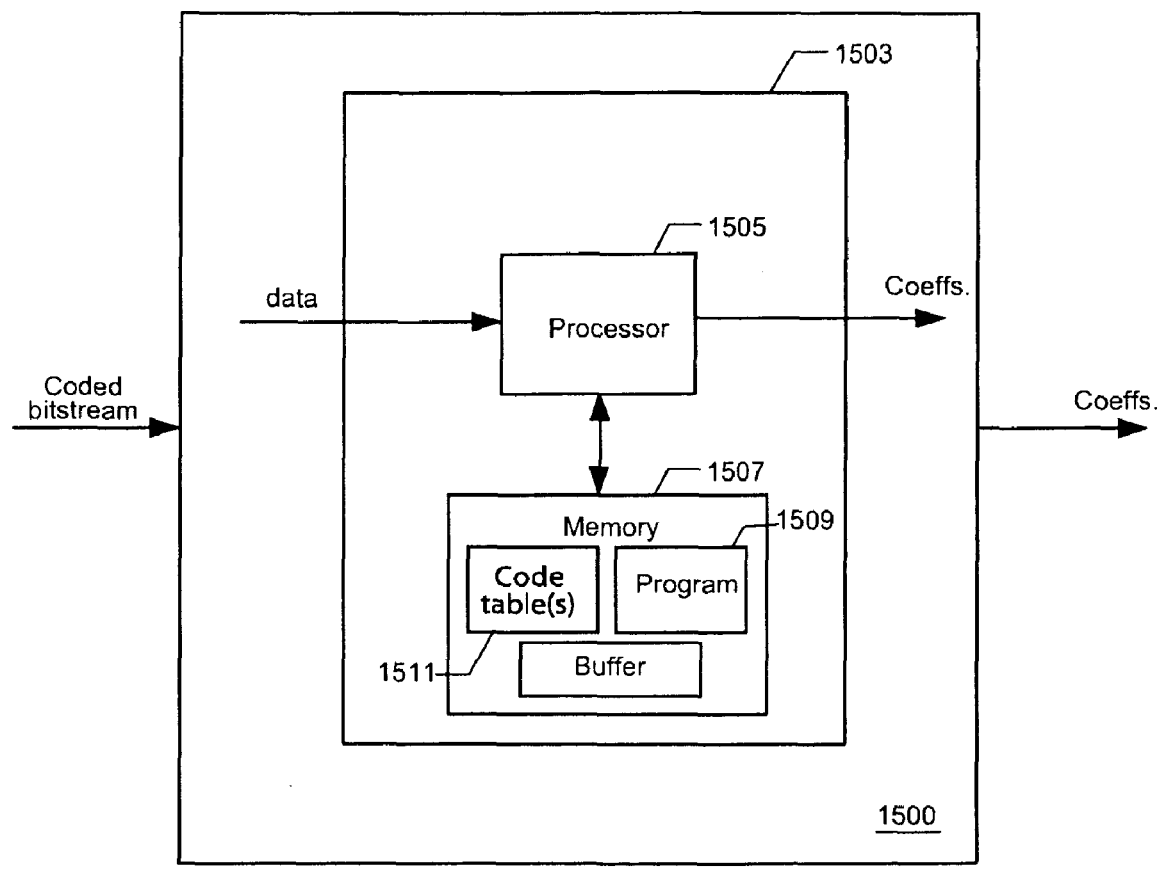
FIG. 15 an embodiment that includes an apparatus that is configured to implement a decoding method as described herein.

FIG. 15 shows another embodiment that includes an apparatus 1500 configured to implement a decoder of a variable length coding method described herein. Decoding apparatus 1500 includes a processing system 1503 that includes one or more processors 1505 and a memory 1507. A single processor is shown in FIG. 15 and those in the art will appreciate that this may represent several processors. Similarly, a single memory subsystem 1507 is shown, and those in the art will appreciate that the memory subsystem may include different elements such as RAM, ROM, and so forth. In addition, the memory subsystem is meant to include any non-volatile memory storage such as a magnetic or optical storage component. A computer program 1509 is included and is loaded into the memory 1507. Note that at any time, some of the programs may be in the different parts of the memory subsystem, as will be understood by those in the art. The program 1509 includes instructions to instruct the processor to implement, in different versions, the recognizing and decoding of codewords. In the embodiment shown, the decoding method uses one or more coding tables 1511 in the memory subsystem 1507. Part of the memory subsystem may also serve as a buffer for incoming bitstream that includes codewords to be decoded.

Other Embodiments

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable medium having a set of instructions encoded thereon that when executed by one or more processors of a processing system cause carrying out any of the coding methods described herein.

Other embodiments include a computer-readable medium having a set of instructions coded thereon that when executed by one or more processors of a processing system cause carrying out any of the decoding methods described herein.

The term "series" as used herein for the series of quantized coefficients is sometimes referred to as a "block" of coefficients, and also as a "series" of coefficients. Sometimes the term "sequence" of coefficients is used. Those in the art will understand that such terms may be interchangeably used and the meaning would be clear to those in the art from the context.

Furthermore, the term coefficients as used herein typically refer to quantized transform coefficients.

Also, in the description, it is assumed that the series includes both the DC coefficient and the AC coefficients of the transform of the block. How to modify the methods described herein to include only the AC coefficients would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or events are used for the most likely-to-occur quantized value or values, and different other values or events are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The transform used in some embodiments is the 8×8 transform defined in the H.264/MEG-4 AVC video coding standard/draft standard for the High Profile. Other embodiments use the transform for the Chinese AVS standard. Other embodiments use a discrete cosine transform (DCT). Other transforms also are possible. Also the bock size described herein is 8 by 8, and other block sizes also may be used in alternate embodiments.

The invention does not depend on any particular type of inter-frame coding if used, or of motion compensation if used for inter-frame coding, or any intra-estimation if used for estimating the pixels of a block using information from neighboring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any nonzero-valued coefficients. In one version, the sign information for any runs of nonzero amplitudes in any region is added together with the information of each amplitude. In an alternate embodiment, the sign information for any runs of nonzero amplitudes in any region may be included in a different manner, e.g., as a code for the series of signs. Other alternate embodiments are also possible for encoding the sign.

Note that in some examples for amplitude encoding, a different number of possible nonzero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the events), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in some embodiments, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that is encoded with logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable medium on which is encoded logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium having a set of instructions, e.g., a computer program encoded thereon that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium encodes logic including a set of instructions that when executed on one or more processors cause implementing a method. Accordingly, aspects of the present invention may take the form of a method, an entirely hardware embodiment, an entirely software embodiment or an embodiment combining software and hardware aspects. Furthermore, the present invention may take the form of a medium (e.g., a computer program product on a computer-readable storage medium) having program code encoded on the medium.

It will be understood that the steps of methods discussed are performed in some embodiments by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Description of Example Embodiments are hereby expressly incorporated into this Description of Example Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given series, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of coding using a coding apparatus, the method comprising:

for an ordered series of quantized transform coefficients of a block of image data, the ordering from low to high spatial frequency according to the transform, the series having a most likely-to-occur amplitude, and at least one other amplitude, including a next-to-most likely-to-occur amplitude, for a first region which could be the whole series:

encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion; and if the position coding of the events leaves any amplitude values other than the most likely-to-occur amplitude to be encoded, encoding the amplitudes of the to-be-encoded amplitude values in the reverse order of the original ordering of the series or cluster of events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion, wherein by a context-based selection criterion is meant a criterion that during encoding is known or derivable from one or more previously encoded items of information.

2. A method as recited in claim 1, wherein the position coding of events includes jointly encoding the next joint position and amplitude event that is defined by the next cluster of one or more consecutive coefficients each having any other than the most likely-to-occur amplitude, each event defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude, the coding for the first cluster that is being position coded being according to a three-dimensional joint VLC mapping selected according to one or more initial position VLC selection criteria, including at least one context-based initial position VLC selection criterion, and after the first cluster is position coded, according to one or more position VLC selection criteria, including at least one context-based position VLC selection criterion.

3. A method as recited in claim 2, wherein for at least one cluster lengths, the third parameter includes an indication of the number of consecutive trailing coefficients in the cluster that each have the next-to-most likely-to-occur amplitude.

4. A method as recited in claim 3, wherein for at least one cluster length, the third parameter includes an indication of which of the coefficients in the cluster have the next-to-most likely-to-occur amplitude.

5. A method as recited in claim 3, wherein for a cluster length of one, the third parameter includes an indication of the amplitude of the coefficient in the cluster that has other than the most likely-to-occur amplitude.

6. A method as recited in claim 2, wherein the amplitude VLC mappings are one-dimensional mappings, and wherein the encoding of the amplitudes of the to-be-encoded amplitude values includes, for each cluster wherein there is at least one amplitude still to be encoded, encoding, in reverse ordering to the ordering of the series, the next to-be-encoded amplitude according to one of the plurality of pre-selected amplitude VLC mappings, the amplitude VLC mapping initially selected according to one or more initial amplitude VLC selection criteria, including at least one context-based initial amplitude VLC selection criterion, and thereafter selected after determining whether to switch to another of the plurality of amplitude VLC mappings according to one or more amplitude VLC selection criteria, including at least one context-based amplitude VLC selection criterion.

7. A method as recited in claim 6, wherein at least one context based amplitude VLC selection criterion includes the maximum amplitude of the previously coded coefficients in the cluster of coefficients having other than the most likely-to-occur value.

8. A method as recited in claim 2, wherein the series is formed from a particular block of image data, and wherein the at least one context-based initial position VLC selection criterion includes the average number of non-zero coefficients in one or more previously encountered blocks that are neighbors to the particular block and that underwent the encoding of position.

9. A method as recited in claim 8, wherein the at least one initial position VLC selection criterion further includes at least one of a quantization step size, and/or whether the particular block is an intra-coded block or an inter-coded block.

10. A method as recited in claim 2, wherein the series is formed from a particular block of image data, and wherein the at least one context-based initial position VLC selection criterion includes a weighted average of the average number of non-zero coefficients in a plurality of previously encountered blocks that are neighbors to the particular block and that underwent the encoding of position.

11. A method as recited in claim 2, wherein the at least one context-based position VLC selection criterion includes one or both of:
the number of coefficients having other than the most likely-to-occur amplitude in the most recently encoded cluster in the first region, and/or
for some or all clusters in the first region that underwent the encoding of position, the maximum number of consecutive quantized coefficients having the most-likely-to-occur value preceding each such previously encoded cluster or clusters.

12. A method as recited in claim 2,
wherein the at least one context-based position VLC selection criterion includes two context-based parameters:
a) the number of coefficients having other than the most likely-to-occur amplitude in the most recently encoded cluster in the first region, and
b) for some or all clusters in the first region that underwent the encoding of position, the maximum number of consecutive quantized coefficients having the most-likely-to-occur value preceding each such previously encoded cluster or clusters, and
wherein a three-dimensional joint VLC mapping switch is considered when a sufficiently large change occurs in either of the two context-based parameters according to a pre-defined change detection criterion.

13. A method as recited in claim 2, wherein the coding of the to-be-coded amplitudes uses variable dimensional amplitude coding.

14. A method as recited in claim 1, wherein the encoding of the position of events is completed for the first region prior to the encoding of the to-be-encoded amplitude values.

15. A method as recited in claim 1,
wherein the encoding the positions uses two-dimensional context adaptive position coding, and
wherein the amplitude VLC mappings are one-dimensional mappings, and wherein the encoding of the amplitudes of the to-be-encoded amplitude values includes, for each cluster wherein there is at least one amplitude still to be encoded, encoding, in reverse ordering to the ordering of the series, the next to-be-encoded amplitude according to one of the plurality of pre-selected amplitude VLC mappings, the amplitude VLC mapping initially selected according to one or more initial amplitude VLC selection criteria, including at least one context-based initial amplitude VLC selection criterion, and thereafter selected after determining whether to switch to another of the plurality of amplitude VLC mappings according to one or more amplitude VLC selection criteria, including at least one context-based amplitude VLC selection criterion.

16. A method as recited in claim 1, further comprising encoding the signs of any coefficients having amplitudes other than the most likely-to-occur amplitude.

17. A method as recited in claim 1, wherein the first region is one of a plurality of regions, the method further comprising:
encoding the coefficients in the remaining region(s).

18. A non-transitory computer-readable medium encoded with computer-executable instructions that when executed by at least one processor of a processing system, cause carrying out of a coding method comprising:
for an ordered series of quantized transform coefficients of a block of image data, the ordering from low to high spatial frequency according to the transform, the series having a most likely-to-occur amplitude, and at least one other amplitude including a next-to-most likely-to-occur amplitude, for a first region which could be the whole series:
encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion; and
if the position coding of the events leaves any amplitude values other than the most likely-to-occur amplitude to be encoded, encoding the amplitudes of the to-be-encoded amplitude values in the reverse order of the original ordering of the series or cluster of events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion, wherein by a context-based selection criterion is meant a criterion that during encoding is known or derivable from one or more previously encoded items of information, wherein the position coding of events includes jointly encoding the next joint position and amplitude event that is defined by the next cluster of one or more consecutive coefficients each having any other than the most likely-to-occur amplitude, each event defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude, the coding for the first cluster being position coded being according to a three-dimensional joint VLC mapping selected according to one or more initial position VLC selection criteria, including at least one context-based initial position VLC selection criterion, and after the first encountered is position coded, according to one or more position VLC selection criteria, including at least one context-based position VLC selection criterion, and wherein the third parameter indicates for all or at least some cluster lengths the number of consecutive trailing coefficients in the cluster that each have the next-to-most likely-to-occur amplitude, and/or wherein in the case that such third parameter is not applicable to all cluster lengths, for at least one cluster length, the third parameter includes an indication of which of the coefficients in the cluster have the next-to-most likely-to-occur amplitude, and/or wherein in the case that such third parameter is not applicable to all cluster lengths, for a cluster length of one, the third parameter is indicative of the amplitude of the coefficient in the cluster having amplitude other than the most likely-to-occur amplitude.

19. A non-transitory computer readable medium as recited in claim 18, wherein the first region is one of a plurality of regions, the method further comprising:
   encoding the coefficients in the remaining region(s).

20. An apparatus configured to encode an ordered series of quantized transform coefficients of a block of image data, the ordering from low to high spatial frequency according to the transform, the series having a most likely-to-occur amplitude, and at least one other amplitude including a next-to-most likely-to-occur amplitude, the apparatus comprising:
   a first region position encoder configured to encode the position of events in a first region of the series, the first region possibly the whole region, each event including one quantized coefficient having other than the most likely-to-occur amplitude or a cluster of at least one quantized coefficient having other than the most likely-to-occur amplitude, the encoding of the position by the first region position encoder using a plurality of predetermined variable length code (VLC) mappings, the first region position encoder configured to initially select an initial position VLC mapping, and to later switch between position VLC mappings according to one or more position VLC selection criteria, including at least one context-based position VLC selection criterion; and
   a first region amplitude encoder configured to encode, in the case the first region position encoder leaves any amplitude values other than the most likely-to-occur amplitude to be encoded, the amplitudes of the to-be-encoded amplitude values in the reverse order of the original ordering of the series or cluster of events includes a cluster, the encoding by the first region amplitude encoder being according to one of a plurality of pre-selected amplitude VLC mappings, the first region amplitude encoder configured to initially select amplitude VLC mapping, and to later switch between the plurality of amplitude VLC mappings according to one or more amplitude VLC selection criteria, including at least one context-based amplitude VLC selection criterion, wherein by a context-based selection criterion is meant a criterion that during encoding is known or derivable from one or more previously encoded items of information, wherein the position coding of events includes jointly encoding the next joint position and amplitude event that is defined by the next cluster of one or more consecutive coefficients each having any other than the most likely-to-occur amplitude, each event defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude, the coding for the first cluster being position coded being according to a three-dimensional joint VLC mapping selected according to one or more initial position VLC selection criteria, including at least one context-based initial position VLC selection criterion, and after the first cluster is position coded, according to one or more position VLC selection criteria, including at least one context-based position VLC selection criterion, and wherein the third parameter indicates for all or at least some cluster lengths the number of consecutive trailing coefficients in the cluster that each have the next-to-most likely-to-occur amplitude, and/or wherein in the case that such third parameter is not applicable to all cluster lengths, for at least one cluster length, the third parameter includes an indication of which of the coefficients in the cluster have the next-to-most likely-to-occur amplitude, and/or wherein in the case that such third parameter is not applicable to all cluster lengths, for a cluster length of one, the third parameter is indicative of the amplitude of the coefficient in the cluster having amplitude other than the most likely-to-occur amplitude.

21. An apparatus as recited in claim 20, wherein the first region is one of a plurality of regions, the apparatus further comprising:
   a second region encoder configured to encode coefficients in the remaining region(s).

22. An apparatus as recited in claim 20, wherein the first region is one of a plurality of regions, and wherein the context adaptive coding method further includes encoding the coefficients in the remaining region(s),
   the apparatus further comprising:
   a second region decoder configured to decode those of the codewords that are of the remaining regions.

23. A method of decoding using a decoding apparatus, the method comprising:
   recognizing codewords in a set of concatenated codewords, the codewords formed by a context adaptive coding method that includes forming codewords based on one or more context based criteria that during encoding are known or derivable from one or more previously encoded items of information,
   the context adaptive coding method comprising:
      for an ordered series of quantized transform coefficients of a block of image data, the ordering from low to high spatial frequency according to the transform, the series having a most likely-to-occur amplitude, and at least one other amplitude including a next-to-most likely-to-occur amplitude, for a first region which could be the whole series:

encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion; and if the position coding of the events leaves any amplitude values other than the most likely-to-occur amplitude to be encoded, encoding the amplitudes of the to-be-encoded amplitude values in the reverse order of the original ordering of the series or cluster of events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion, wherein the position coding of events includes jointly encoding the next joint position and amplitude event that is defined by the next cluster of one or more consecutive coefficients each having any other than the most likely-to-occur amplitude, each event defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude, the coding for the first cluster being position coded being according to a three-dimensional joint VLC mapping selected according to one or more initial position VLC selection criteria, including at least one context-based initial position VLC selection criterion, and after the first cluster is position coded, according to one or more position VLC selection criteria, including at least one context-based position VLC selection criterion, and wherein the third parameter indicates for all or at least some cluster lengths the number of consecutive trailing coefficients in the cluster that each have the next-to-most likely-to-occur amplitude, and/or wherein in the case that such third parameter is not applicable to all cluster lengths, for at least one cluster length, the third parameter includes an indication of which of the coefficients in the cluster have the next-to-most likely-to-occur amplitude, and/or wherein in the case that such third parameter is not applicable to all cluster lengths, for a cluster length of one, the third parameter is indicative of the amplitude of the coefficient in the cluster having amplitude other than the most likely-to-occur amplitude; and decoding the codewords, wherein during decoding of a codeword, any context-based selection criterion is known or derivable from one or more previously decoded items of information.

24. A method as recited in claim 23, wherein the first region is one of a plurality of regions, and wherein the coding method further includes encoding the coefficients in the remaining region(s), the method further comprising:
  decoding those of the codewords that are of the remaining regions.

25. An apparatus configured to decode a set of concatenated codewords formed by a context adaptive coding method, the apparatus comprising:

a codeword recognizer configured to recognize codewords in the set of concatenated codewords that is formed by the context adaptive coding method, including forming codewords based on one or more context based criteria that during encoding are known or derivable from one or more previously encoded items of information, the context adaptive coding method comprising:
  for an ordered series of quantized transform coefficients of a block of image data, the ordering from low to high spatial frequency according to the transform, the series having a most likely-to-occur amplitude, and at least one other amplitude including a next-to-most likely-to-occur amplitude, for a first region which could be the whole series:
  encoding the position of events in the first region that include one quantized coefficient having other than the most likely-to-occur amplitude or a cluster of at least one quantized coefficient having other than the most likely-to-occur amplitude, the encoding using a plurality of predetermined variable length code (VLC) mappings, including initially selecting an initial position VLC mapping, and later switching between position VLC mappings according to one or more position VLC selection criteria, including at least one context-based position VLC selection criterion; and if the position coding of the events leaves any amplitude values other than the most likely-to-occur amplitude to be encoded, encoding the amplitudes of the to-be-encoded amplitude values in the reverse order of the original ordering of the series or cluster of events includes a cluster, the encoding according to one of a plurality of pre-selected amplitude VLC mappings, including initially selecting an amplitude VLC mapping, and switching between the plurality of amplitude VLC mappings according to one or more amplitude VLC selection criteria, including at least one context-based amplitude VLC selection criterion, wherein the position coding of events includes jointly encoding the next joint position and amplitude event that is defined by the next cluster of one or more consecutive coefficients each having any other than the most likely-to-occur amplitude, each event defined by three parameters: the number, possibly zero, of coefficients having the most likely-to-occur amplitude preceding the cluster, the number of coefficients in the cluster having other than the most likely-to-occur amplitude, and a third parameter related to amplitudes in the cluster having other than the most likely-to-occur amplitude, the coding for the first cluster being position coded being according to a three-dimensional joint VLC mapping selected according to one or more initial position VLC selection criteria, including at least one context-based initial position VLC selection criterion, and after the first cluster is position coded, according to one or more position VLC selection criteria, including at least one context-based position VLC selection criterion, and wherein the third parameter indicates for all or at least some cluster lengths the number of consecutive trailing coefficients in the cluster that each have the next-to-most likely-to-occur amplitude, and/or wherein in the case that such third parameter is not applicable to all cluster lengths, for at least one cluster length, the third parameter includes an indication of which of the coefficients in the cluster have the next-to-most likely-to-occur amplitude, and/or wherein in the case that such third parameter is not applicable to all cluster lengths, for a cluster length of one, the third parameter is indicative of the amplitude of the coefficient in the cluster having amplitude other than the most likely-to-occur amplitude; and
a codeword decoder configured to decode the recognized codeword, wherein during decoding of a codeword by the codeword decoder, any context-based selection criterion is known or derivable from one or more previously decoded items of information.

* * * * *